US012612944B2

(12) United States Patent (10) Patent No.: US 12,612,944 B2
Sato et al. (45) Date of Patent: Apr. 28, 2026

(54) SLIDING MEMBER AND BEARING

(71) Applicant: SENJU METAL INDUSTRY CO., LTD., Tokyo (JP)

(72) Inventors: Naoki Sato, Tokyo (JP); Takumi Yashiro, Tokyo (JP); Takashi Akagawa, Tokyo (JP); Yuji Kawamata, Tokyo (JP); Ryoichi Suzuki, Tokyo (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 18/708,397

(22) PCT Filed: Nov. 21, 2022

(86) PCT No.: PCT/JP2022/042950
§ 371 (c)(1),
(2) Date: May 8, 2024

(87) PCT Pub. No.: WO2023/127350
PCT Pub. Date: Jul. 6, 2023

(65) Prior Publication Data
US 2024/0337291 A1 Oct. 10, 2024

(30) Foreign Application Priority Data

Dec. 28, 2021 (JP) ................................. 2021-214609

(51) Int. Cl.
*F16C 33/12* (2006.01)
*F16C 17/02* (2006.01)

(52) U.S. Cl.
CPC ............ *F16C 33/122* (2013.01); *F16C 17/02* (2013.01)

(58) Field of Classification Search
None
See application file for complete search history.

(56) References Cited

U.S. PATENT DOCUMENTS 6,548,188 B1 4/2003 Yanase et al.
6,607,820 B2 * 8/2003 Niwa ................... F16C 33/208
384/909

(Continued)

FOREIGN PATENT DOCUMENTS

CN 1312330 9/2001
CN 103403375 11/2013

(Continued)

OTHER PUBLICATIONS

Tobar et al., "Characteristics of Tribaloy T-800 and T-900 coatings on steel substrates by laser cladding", Dec. 3, 2007, Surface & Coatings Technology, vol. 202, pp. 2297-2301 (Year: 2007).*

(Continued)

*Primary Examiner* — Seth Dumbris

(74) *Attorney, Agent, or Firm* — Wenderoth, Lind & Ponack, L.L.P.

(57) ABSTRACT

A sliding member includes a metal substrate, a porous layer on one surface of the metal substrate, and a sliding layer covering the porous layer. The sliding layer has a resin composition, and the porous layer has a matrix phase including copper and tin, and hard particles that are dispersed in the matrix phase and include a Laves phase constituted of cobalt, molybdenum and silicon.

12 Claims, 21 Drawing Sheets

(56) References Cited

U.S. PATENT DOCUMENTS

| | | | |
|---|---|---|---|
| 2002/0015839 A1 | 2/2002 | Niwa et al. | |
| 2002/0155957 A1* | 10/2002 | Danly, Sr. | F16C 33/12 |
| | | | 508/105 |
| 2003/0235355 A1* | 12/2003 | Hiramatsu | F16C 33/206 |
| | | | 384/276 |
| 2005/0069448 A1* | 3/2005 | Sato | B22F 7/04 |
| | | | 419/33 |
| 2014/0099048 A1 | 4/2014 | Kurata et al. | |
| 2017/0253950 A1* | 9/2017 | Shinohara | F01L 3/04 |
| 2024/0044368 A1 | 2/2024 | Sato et al. | |

FOREIGN PATENT DOCUMENTS

| | | |
|---|---|---|
| JP | 2001-105177 | 4/2001 |
| JP | 2001-355634 | 12/2001 |
| JP | 2005-163074 | 6/2005 |
| JP | 2008-50688 | 3/2008 |
| JP | 2018-71710 | 5/2018 |
| JP | 6940801 | 9/2021 |
| KR | 10-0568340 | 4/2006 |

OTHER PUBLICATIONS

International Search Report issued Feb. 7, 2023 in International (PCT) Application No. PCT/JP2022/042950.

Notice of Reasons for Refusal issued Feb. 17, 2022 in Japanese Application No. 2021-214609 (with English translation).

Decision to Grant a Patent issued Jul. 7, 2022 in Japanese Application No. 2021-214609 (with English translation).

First Office Action dated Aug. 22, 2024 in Chinese Application No. 202280082456.X with English translation.

Office Action issued May 19, 2025 in Korea Patent Application No. 10-2024-7019916, with English-language Translation.

Request for the Submission of an Opinion issued Sep. 9, 2025 in Korean Patent Application No. 10-2024-7019916, with English translation.

* cited by examiner

Figure 8:
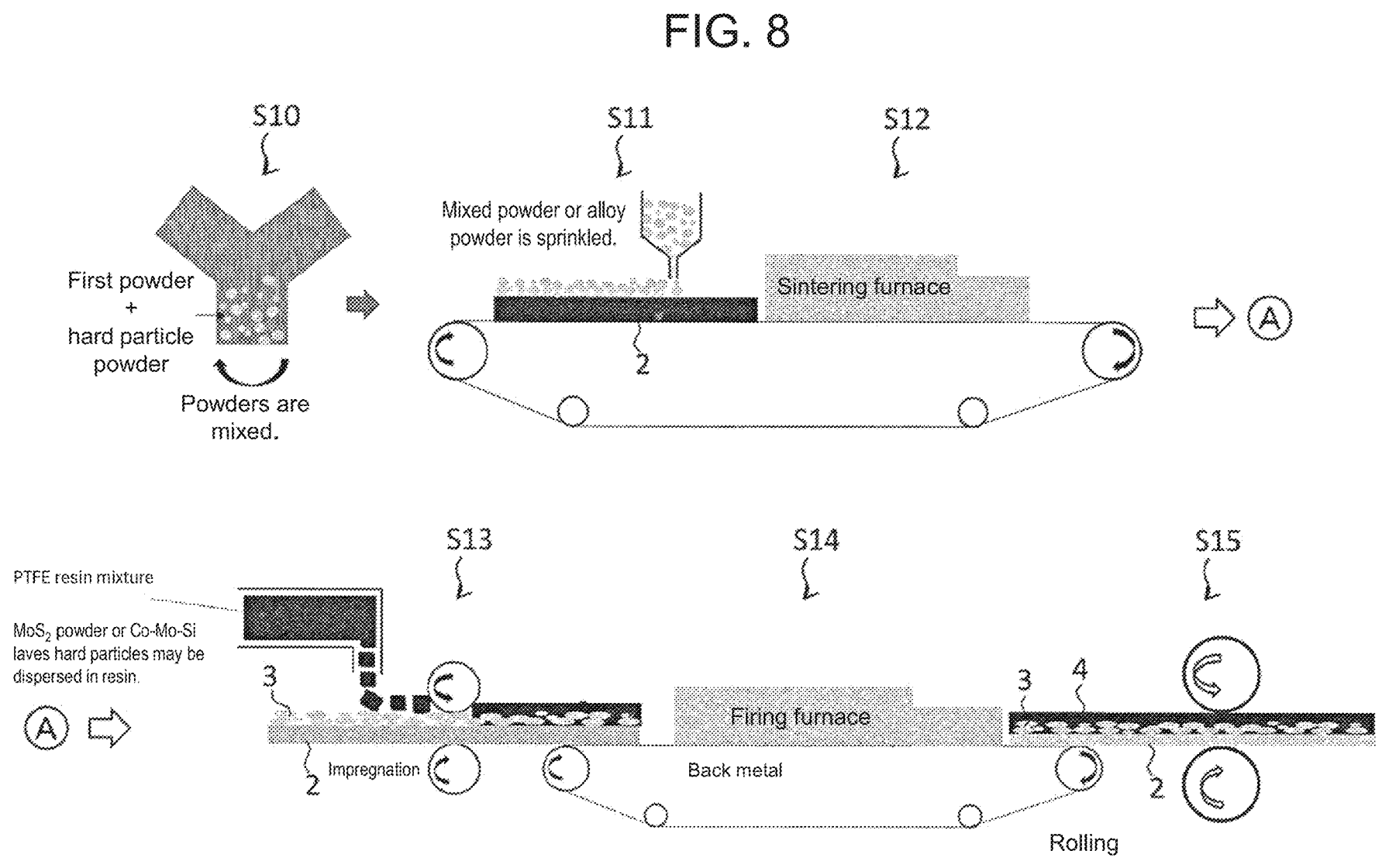

First powder
+
hard particle
powder

Powders are
mixed.

S11

Mixed powder or alloy
powder is sprinkled.

S12

Sintering furnace

A

A

S13

PTFE resin mixture

MoS$_2$ powder or Co-Mo-Si
laves hard particles may be
dispersed in resin.

Impregnation

S14

Firing furnace

Back metal

S15

Rolling

SLIDING MEMBER AND BEARING

TECHNICAL FIELD

The present disclosure relates to a sliding member and a bearing comprising the sliding member.

BACKGROUND ART

A lead bronze-based sintered bearing alloy is widely used as sliding members for cars and general industrial machines. Main ingredients of lead bronze are Cu, Sn, and Pb, and the lead bronze-based sintered bearing alloy is prescribed as a copper alloy casting in JIS H5120 and the like. Examples of uses of a copper alloy prescribed as CAC603 (hereinafter referred to as LBC3) among these include bearings for medium and high speeds and high loads and bearings for large-sized engines. Lead contained in this copper alloy at around 10% by mass takes a role in improving friction characteristics as a solid lubricant. When lead, which is a soft metal, easily deforms plastically, lead functions as a lubricant between two surfaces rubbed together, and the copper alloy is consequently a material excellent in friction characteristics.

However, LBC3, which is a general-purpose item, is markedly abraded or seized in a use environment such as insufficient boundary lubrication due to an increase in speed or the load. Improvement therein is an object.

Japanese Patent Publication No. 2008-50688 and Japanese Patent Publication No. 2005-163074 propose a copper-based sliding material of a Cu—Sn—Bi alloy, which has Cu as the main ingredient and to which Sn and Bi are added to the Cu base, as a sliding material containing no lead.

SUMMARY OF INVENTION

It has been desired that a sliding member and a bearing improved in seizure resistance as compared with a sliding member and a bearing made of LBC3 are provided.

Solution to Problem

A sliding member according to one embodiment comprises a metal substrate, a porous layer formed on one surface of the metal substrate, and a sliding layer covering the porous layer, the sliding layer is formed of a resin composition, and the porous layer has a matrix phase comprising Cu and Sn, and hard particles dispersed in the matrix phase and comprising a Laves phase constituted of a composition of Co, Mo and Si.

A sliding member according to another embodiment comprises a metal substrate, a porous layer formed on one surface of the metal substrate, and a sliding layer covering the porous layer, the sliding layer is formed of a resin composition, and a hard particle powder comprising a Laves phase constituted of a composition of Co, Mo and Si is dispersed in the sliding layer.

BRIEF DESCRIPTION OF DRAWINGS

FIG. 8 shows a process for manufacturing a sliding member according to one embodiment.

DESCRIPTION OF EMBODIMENTS

Figure 1:
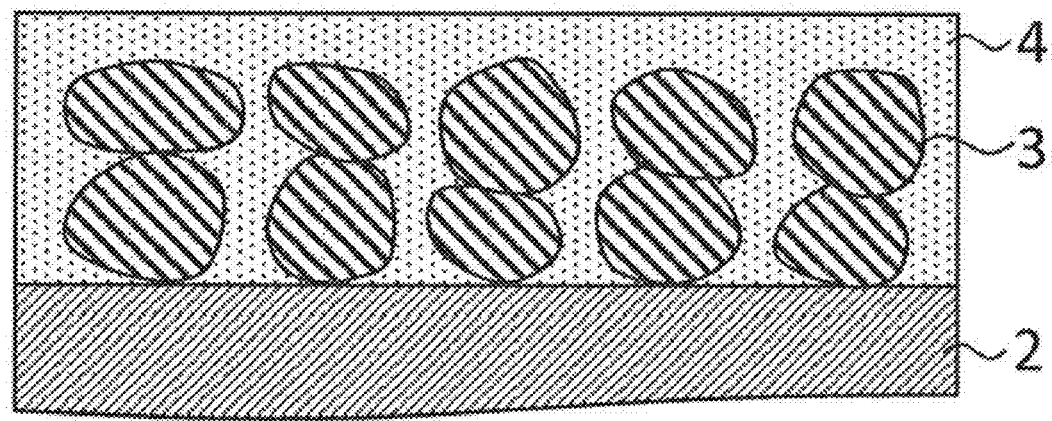
FIG. 1 is a longitudinal section showing a schematic configuration of a sliding member according to one embodiment.

"%" with respect to compositions used herein is "% by mass" unless otherwise specified. "A to B" (both A and B are numbers) used herein means "A or more and B or less" unless otherwise specified. The "main ingredient" used herein refers to a component contained at 50% by mass or more with respect to the whole composition. As used herein, the "hard particle powder" refers to powder in the mixed powder before sintering or powder dispersed in the resin composition of the sliding layer, and the "hard particles" refer to particles in the porous layer after the sintering. Since Cu and Sn contained in the hard particle powder move into a matrix phase during the sintering to some extent as described below, the content of the hard particles in a porous layer varies from the amount of hard particle powder blended in the mixed powder, and the contents of constituent elements in the hard particles are different from the contents of constituent elements in the hard particle powder (the hard particles are particles having a composition in which the contents of Sn and Cu among the chemical components decrease to some extent as compared with the hard particle powder).

A sliding member according to a first aspect of an embodiment comprises a metal substrate, a porous layer formed on one surface of the metal substrate, and a sliding layer covering the porous layer, the sliding layer is formed of a resin composition, the porous layer has a matrix phase comprising Cu and Sn, and hard particles dispersed in the matrix phase and comprising a Laves phase constituted of a composition of Co, Mo and Si.

A sliding member according to a second aspect of an embodiment is the sliding member according to the first aspect, wherein the porous layer further has compound phases dispersed in the matrix phase and containing Co, Fe, Ni, Si, and Cr.

A sliding member according to a third aspect of the embodiment is the sliding member according to the first or second aspect, wherein the content of the hard particles is 40% by mass or less per 100% by mass of the whole porous layer.

A sliding member according to a fourth aspect of the embodiment is the sliding member according to any of the first to third aspects, wherein one or more of a hard particle powder comprising the Laves phase constituted of the composition of Co, Mo and Si, powder comprising $MoS_2$, and bronze powder not comprising a Laves phase are dispersed in the sliding layer.

A sliding member according to a fifth aspect of the embodiment comprises a metal substrate, a porous layer formed on one surface of the metal substrate, and a sliding layer covering the porous layer, the sliding layer is formed of a resin composition, and a hard particle powder comprising a Laves phase constituted of a composition of Co, Mo and Si is dispersed in the sliding layer.

A sliding member according to a sixth aspect of the embodiment is the sliding member according to any of the first to fifth aspects, wherein the ratio of the thickness of the porous layer to the thickness of the sliding layer is 6:4 to 8:2.

A sliding member according to a seventh aspect of the embodiment is the sliding member according to any of first to sixth aspects, wherein the sum of the content of the hard particles and the content of the hard particle powder is 1 to 20% by mass per 100% by mass in total of the porous layer and the sliding layer.

A bearing according to an eighth aspect of an embodiment is a bearing, comprising the sliding member according to any of the first to seventh aspects, wherein the bearing has a cylindrical inner peripheral surface, and the inner peripheral surface is constituted of the sliding layer.

Hereinafter, specific examples of embodiments will be described in detail with reference to the attached drawings. <Configuration of Sliding Member>

Figure 2A:
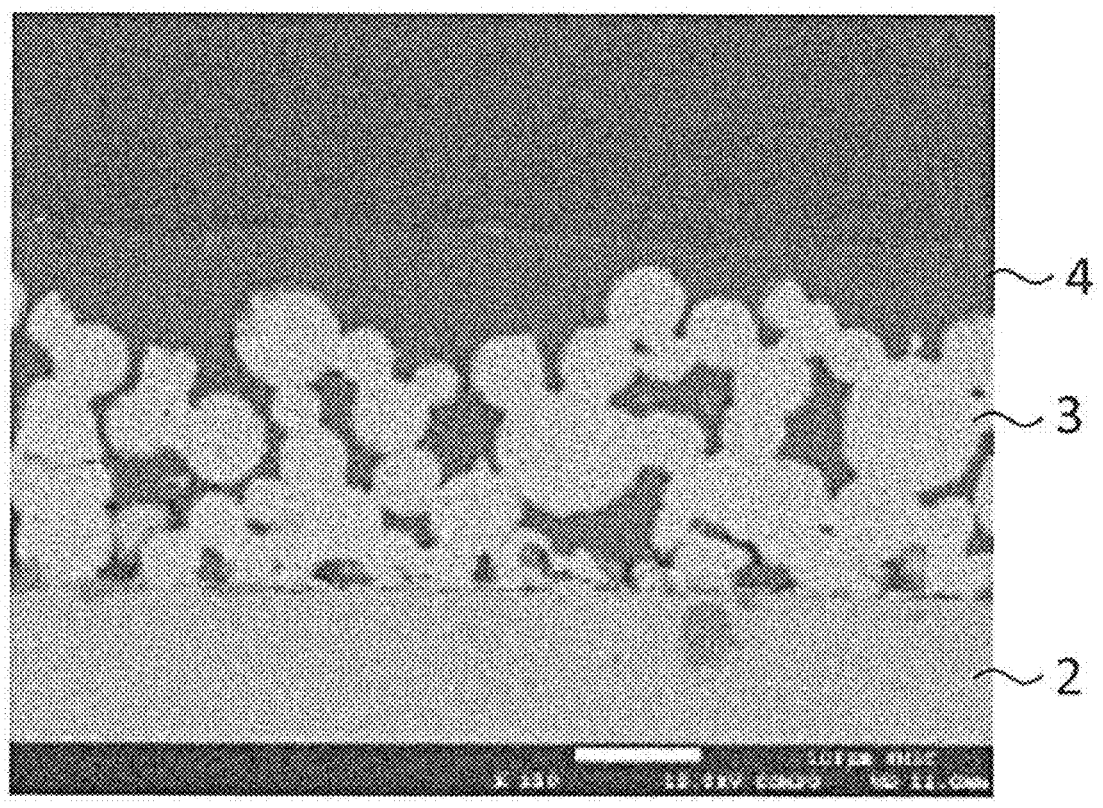
FIG. 2A is a reflected electron composition image of a sectional structure of a sliding member according to one embodiment.

FIG. 1 is a longitudinal section showing a schematic structure of a sliding member 1 according to one embodiment, and FIG. 2A is a reflected electron composition image of the sectional structure of the sliding member 1. As shown in FIGS. 1 and 2A, the sliding member 1 comprises a metal substrate 2, a porous layer 3 formed on one surface of the metal substrate 2, and a sliding layer 4 covering the porous layer 3.

Among these, as long as the material of the metal substrate 2 has such strength and shape stability as to be used as a back metal base material of a bearing, the material of the metal substrate 2 is not particularly limited, but may be, for example, low-carbon steel (SPCC, SS400, or the like) or a copper-plated steel plate, in which a Fe-based plate material is plated with Cu.

Metal powder (the below-described mixed powder or alloy powder into which the mixed powder is formed at the time of spraying of the mixed powder) is sintered on the surface of the metal substrate 2 to form the porous layer 3. The thickness of the porous layer 3 may be such a thickness that two or more metal powder particles can be stacked and sintered, for example, a thickness of 0.3 mm or less.

Figure 2B:
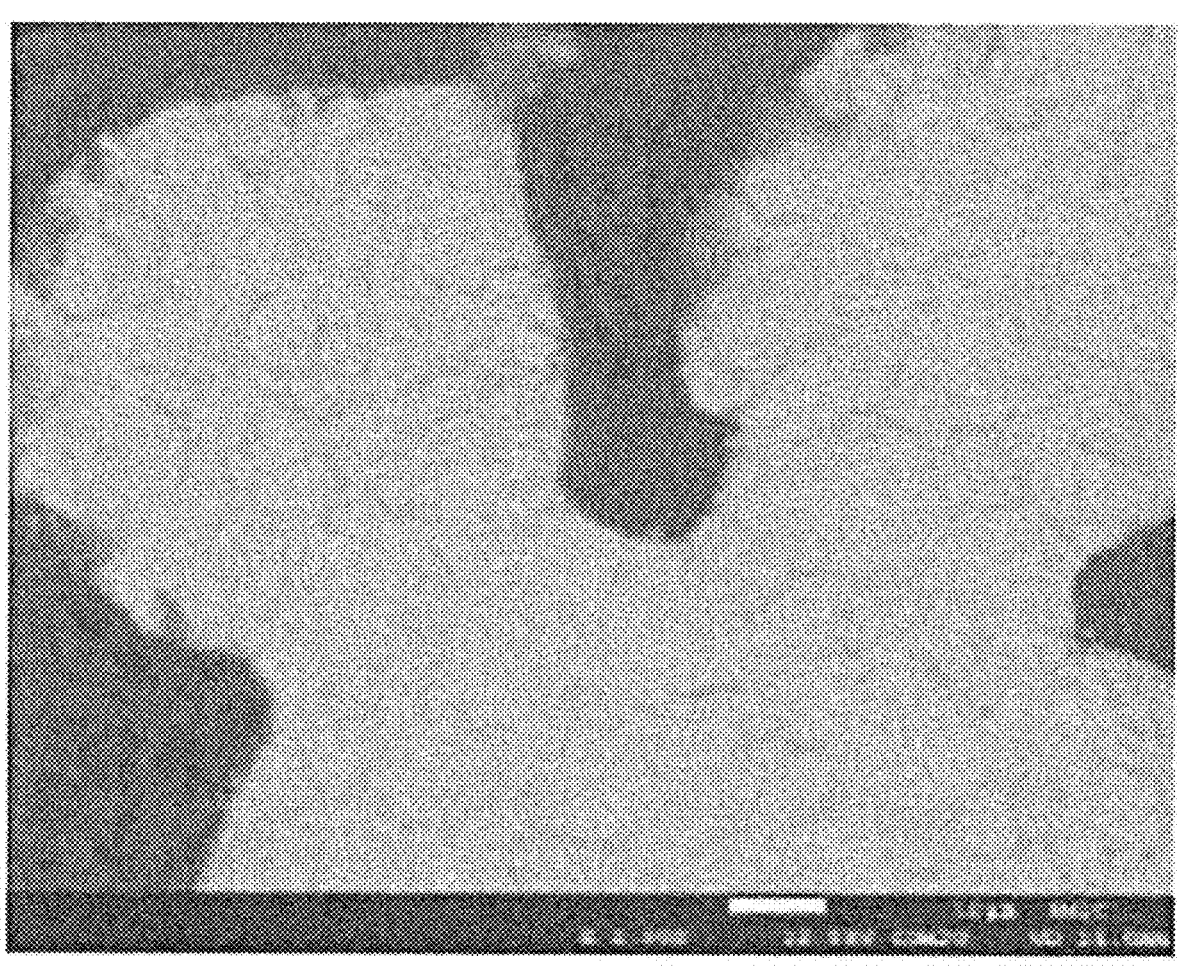
FIG. 2B is a reflected electron composition image of a sectional structure of the porous layer of the sliding member according to the one embodiment.
Figure 2C:
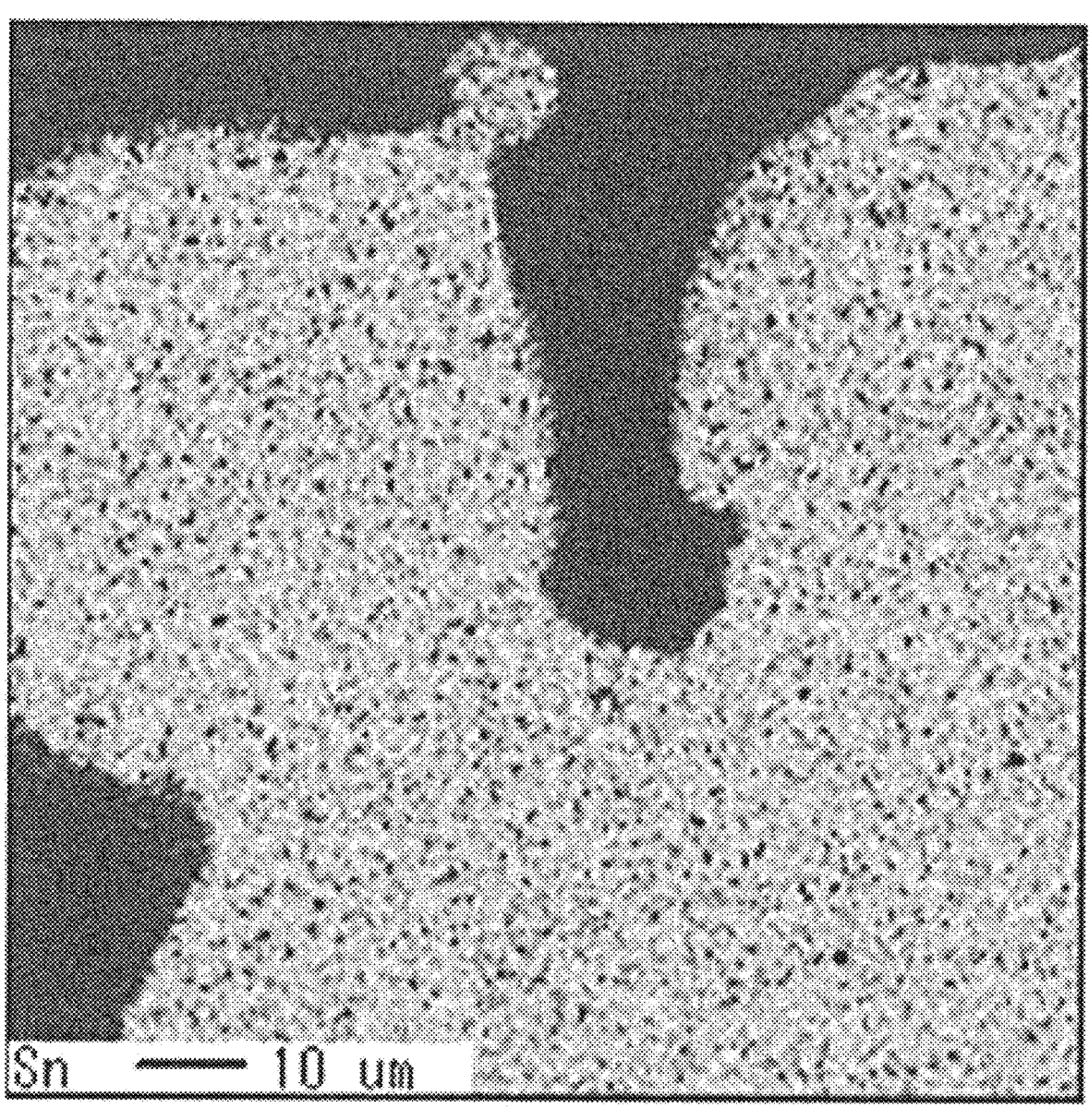
FIG. 2C is a mapping image of Sn in a sectional structure of the porous layer of the sliding member according to the one embodiment by electron probe microanalyzer (EPMA).
Figure 2D:
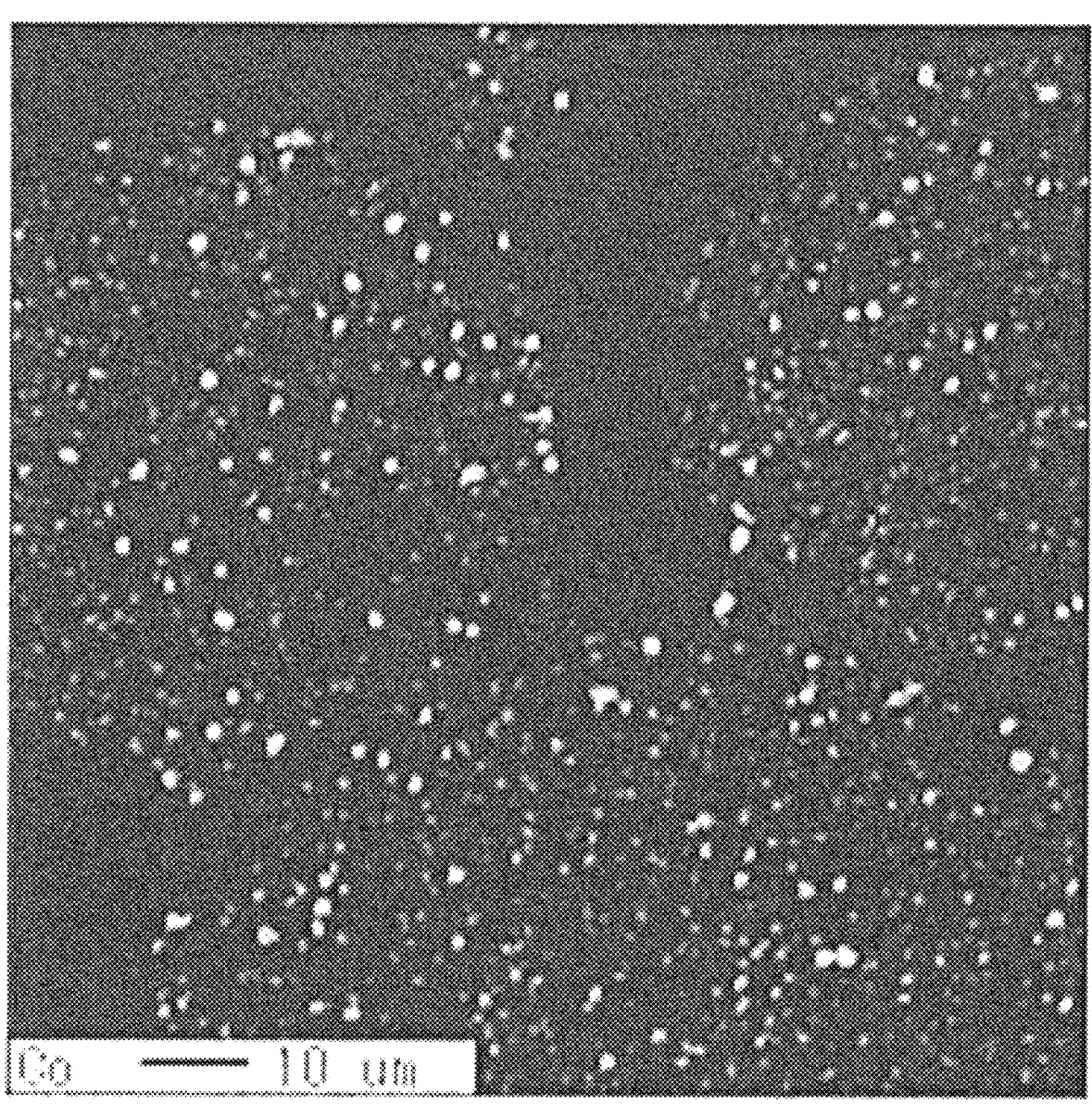
FIG. 2D is a mapping image of Co in a sectional structure of the porous layer of the sliding member according to the one embodiment by EPMA.
Figure 2E:
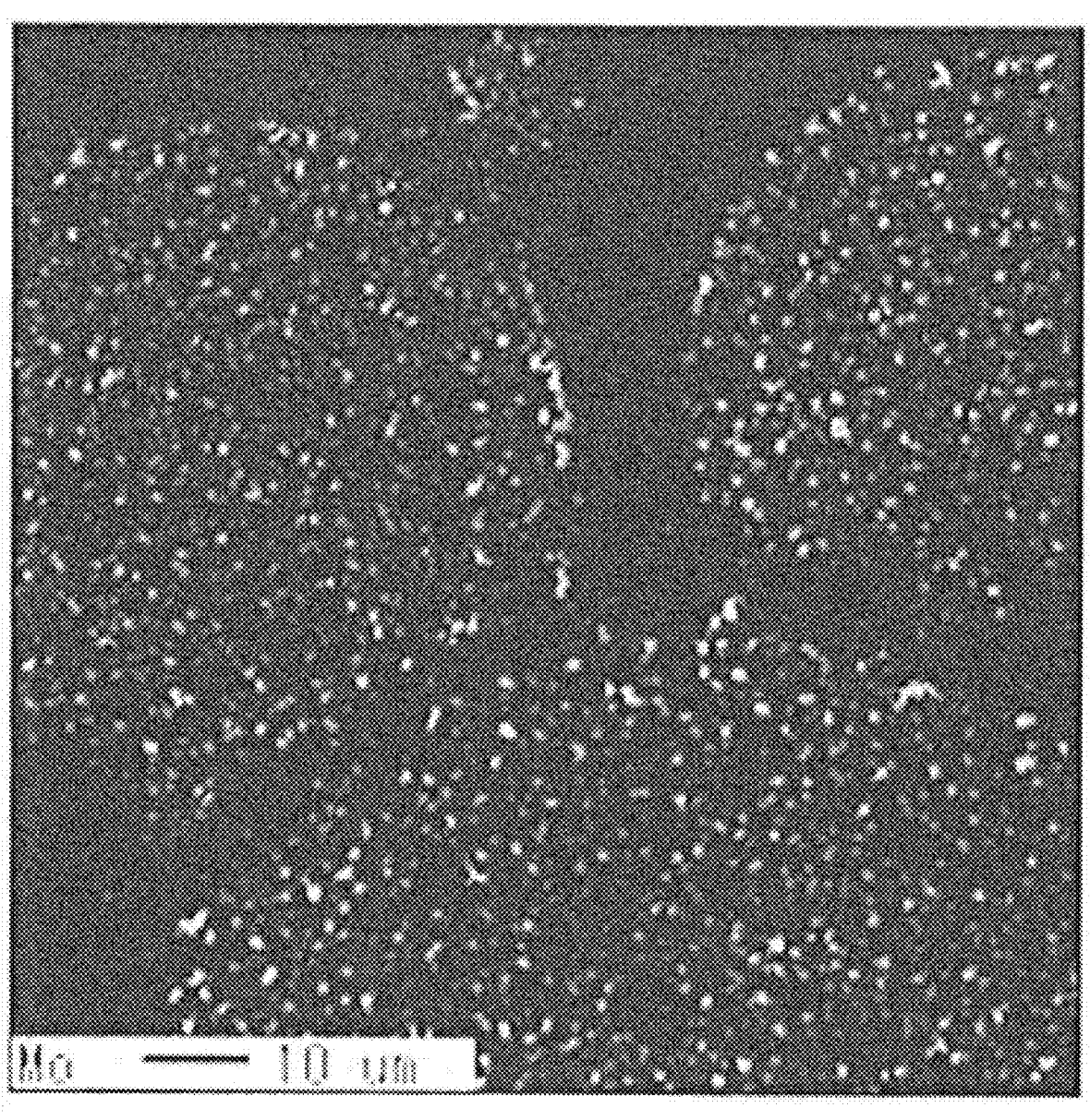
FIG. 2E is a mapping image of Mo in a sectional structure of the porous layer of the sliding member according to the one embodiment by EPMA.
Figure 2F:
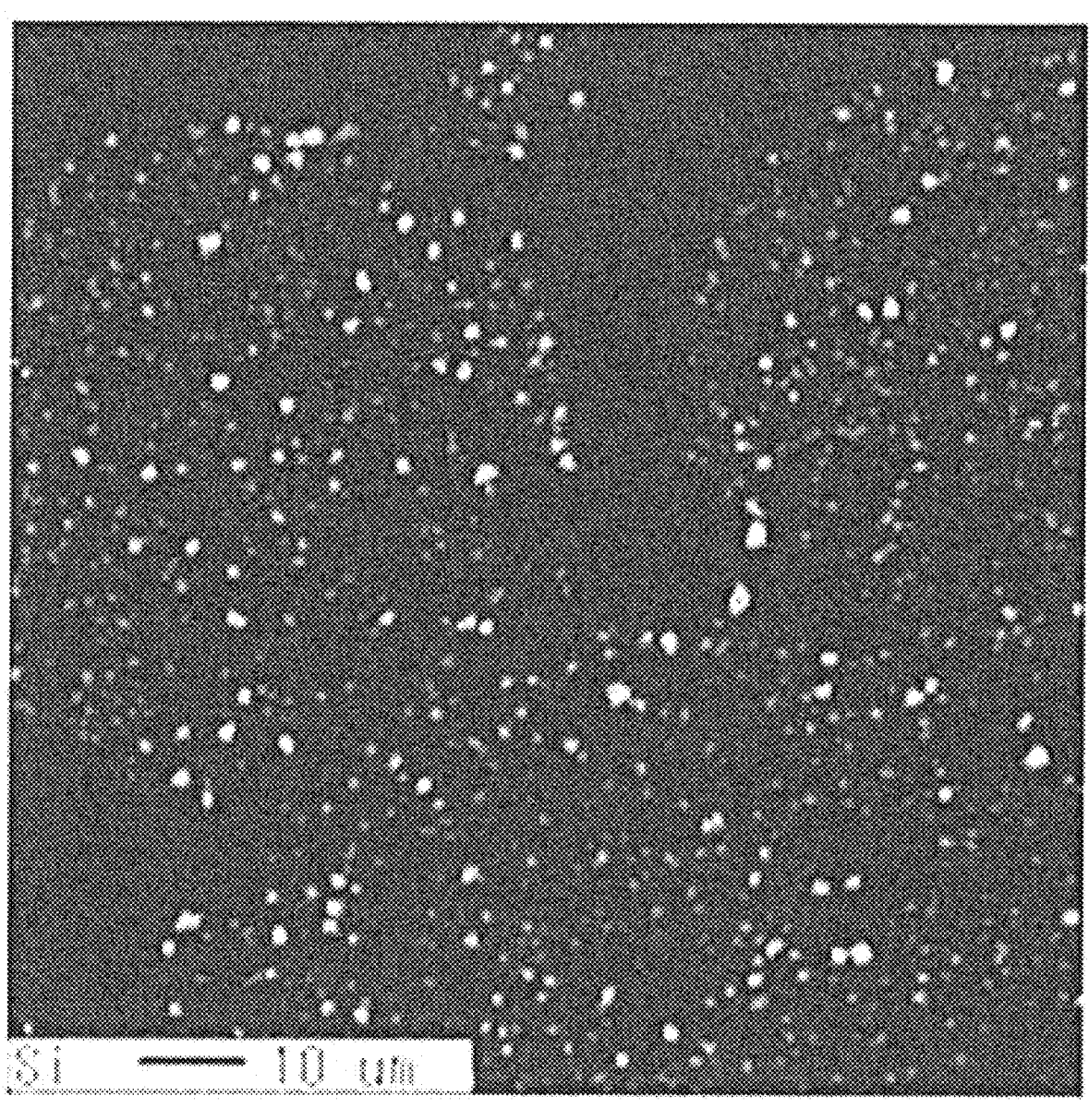
FIG. 2F is a mapping image of Si in a sectional structure of the porous layer of the sliding member according to the one embodiment by EPMA.
Figure 3A:
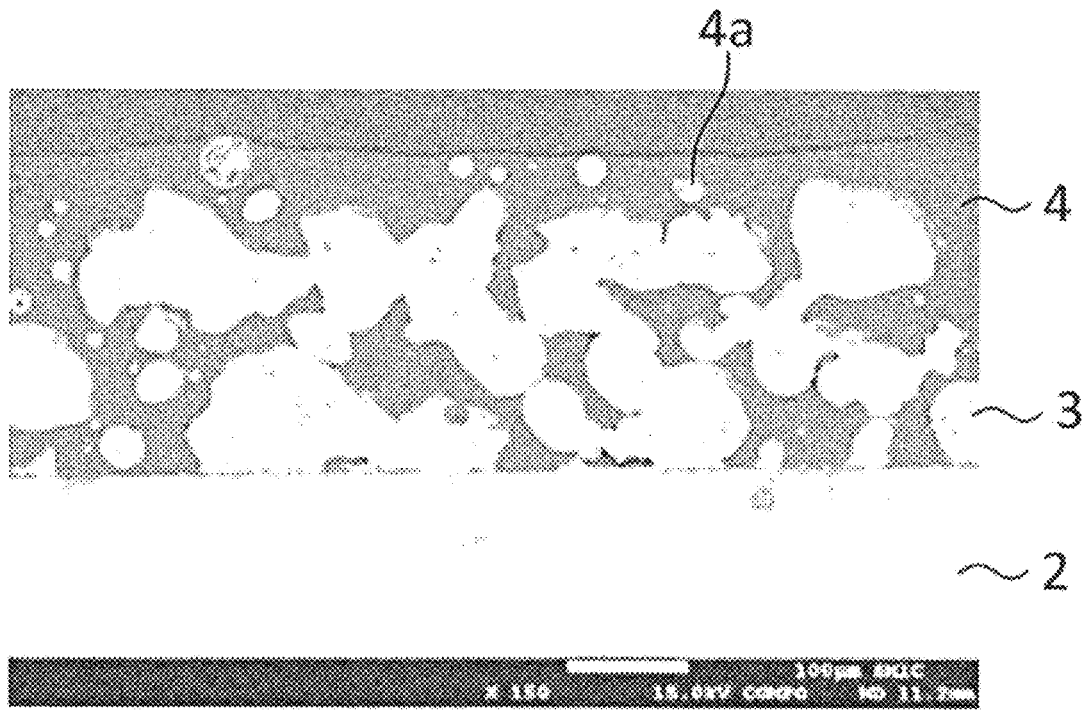
FIG. 3A is a reflected electron composition image of a sectional structure of a sliding member according to one variation of one embodiment.
Figure 3B:
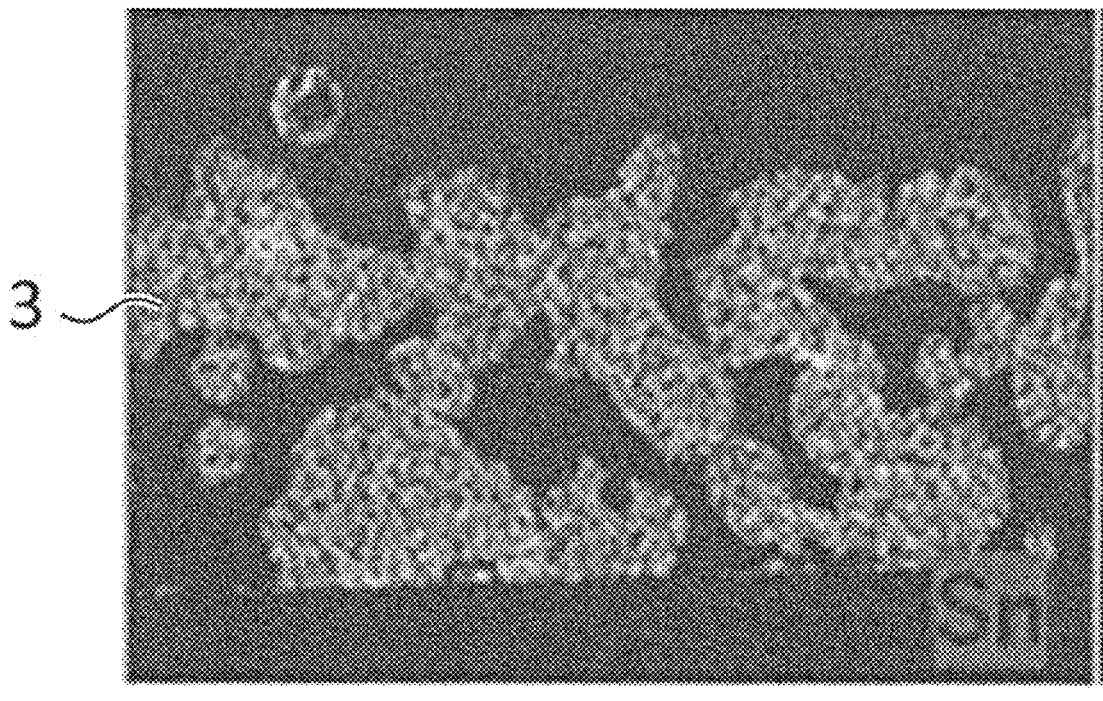
FIG. 3B is a mapping image of Sn in a sectional structure of the sliding member according to the one variation of the one embodiment by EPMA.
Figure 3C:
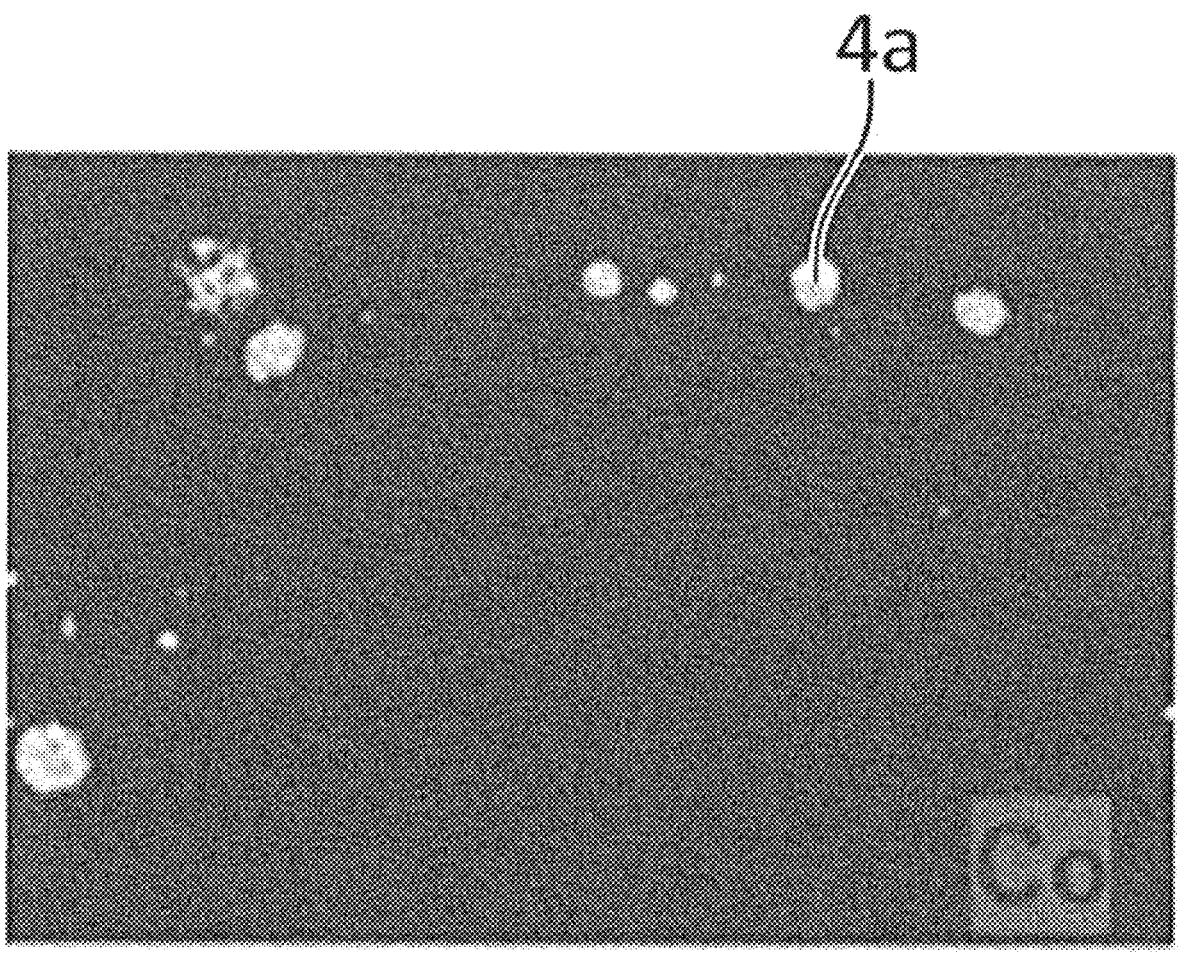
FIG. 3C is a mapping image of Co in a sectional structure of the sliding member according to the one variation of the one embodiment by EPMA.
Figure 3D:
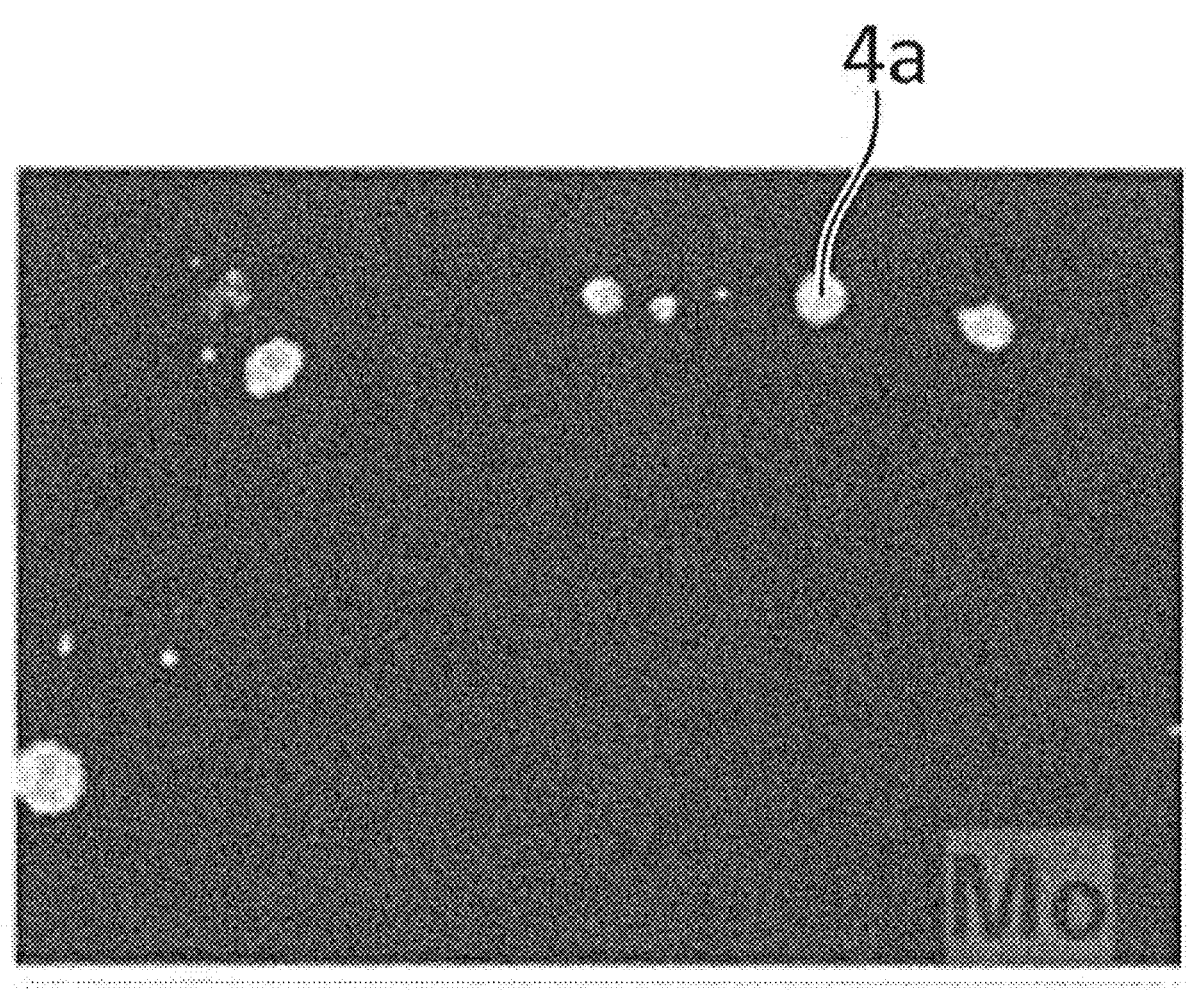
FIG. 3D is a mapping image of Mo in a sectional structure of the sliding member according to the one variation of the one embodiment by EPMA.
Figure 3E:
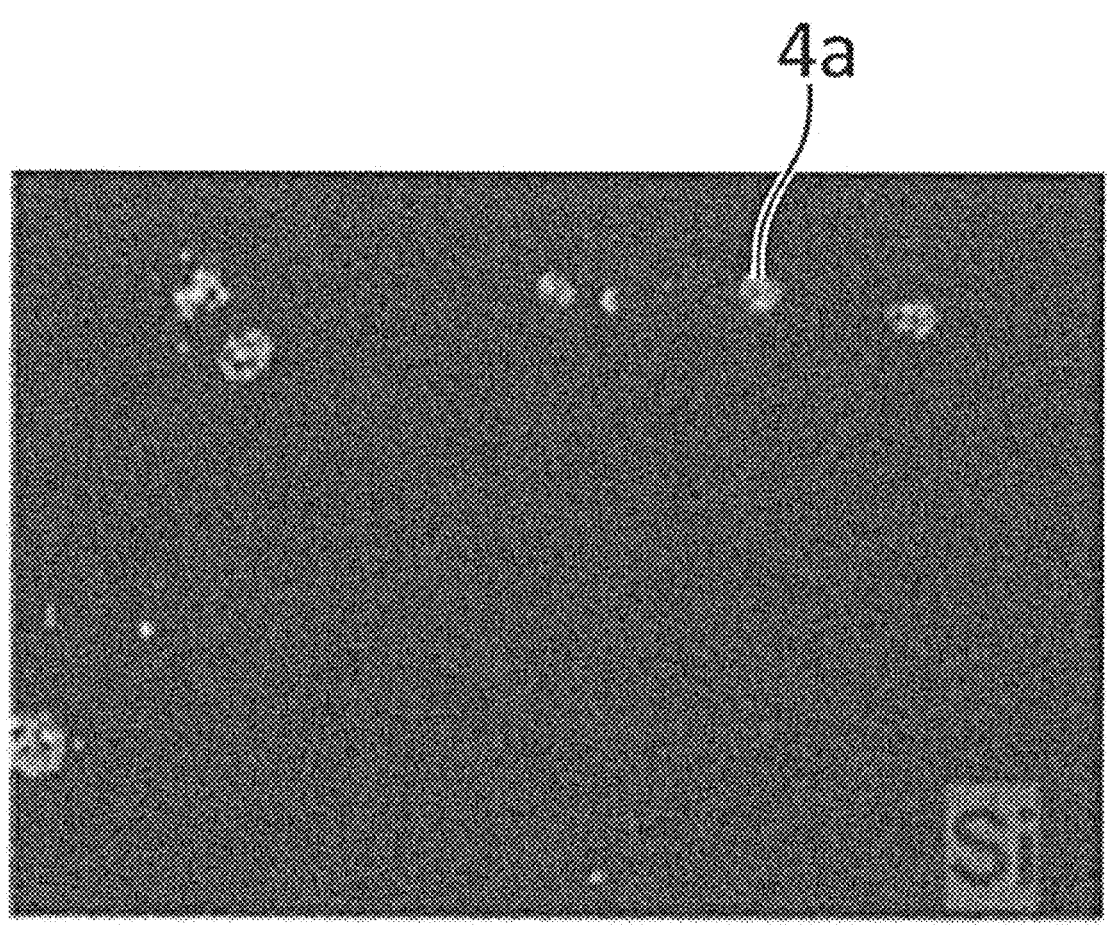
FIG. 3E is a mapping image of Si in a sectional structure of the sliding member according to the one variation of the one embodiment by EPMA.

The porous layer 3 has a matrix phase containing Cu and Sn and hard particles dispersed in the matrix phase. FIG. 2B is a reflected electron composition image of a sectional structure of the porous layer 3. FIG. 2C is a mapping image of Sn in a sectional structure of the porous layer 3 using an electron beam microanalyzer (electron probe microanalyzer, EPMA). FIG. 2D is a mapping image of Co, FIG. 2E is a mapping image of Mo, and FIG. 2F is a mapping image of Si. In the example shown in FIGS. 2B to 2F, the alloy powder into which the mixed powder described below is formed during the spraying of the mixed powder is sintered to form the porous layer 3. The formation of the mixed powder into the alloy powder promotes the sintering of the powder to form necks, resulting in bonding the powders sufficiently. The formation of the mixed powder into the alloy powder also micronizes the hard particles and disperses the hard particles in the matrix phase uniformly. In a variation in which the hard particle powder 4a is dispersed in the sliding layer 4 described below, the porous layer 3 may not contain the hard particles. FIG. 3A is a reflected electron composition image of a sectional structure of the sliding member 1 wherein the porous layer 3 does not contain the hard particles, and the hard particle powder 4a is dispersed in the sliding layer 4. FIG. 3B is a mapping image of Sn by EPMA, FIG. 3C is a mapping image of Co by EPMA, FIG. 3D is a mapping image of Mo by EPMA, and FIG. 3E is a mapping image of Si by EPMA.

As shown in FIGS. 2C and 3B, the matrix phase is a bronze-based alloy containing Cu as the main ingredient and further containing Sn. The matrix phase may be constituted of a solid solution of Cu, Sn, and Ni.

Bi particles may be distributed on the crystal grain boundary of the matrix phase. In this case, when Bi exhibits self-lubrication action on the frictional surface to which the porous layer 3 is partially exposed by the abrasion of the sliding layer 4 in the same way as Pb of the conventional lead bronze, and functions as a lubricant between the two rubbed surfaces, the friction can be reduced.

As shown in FIGS. 2D to 2F, hard particles contain a Laves phase constituted of a composition of Co, Mo, and Si. As shown in FIGS. 3B to 3E, the hard particle powder 4a contains a Laves phase constituted of a composition of Co, Mo and Si. Here, the Laves phase is an intermetallic compound based on an $AB_2$ type wherein the $AB_2$ type comprises an A element and a B element, and the atom radius ratio A to B is around 1.2:1, and includes three structures, namely a $MgZn_2$ (C14) type, a $MgCu_2$ (C15) type, and a $MgNi_2$ (C36) type. The Laves phase constituted of a composition of Co, Mo, and Si (more specifically, $Co_3Mo_2Si$) is a Laves phase in which the A element is Mo, the B element is Co, and 25 at % of the Co is substituted with Si, and is of the $MgZn_2$ type, having a hexagonal crystal structure. The Vickers hardness of the Laves phase constituted of $Co_3Mo_2Si$ is 1000 to 1200 Hv.

It is conceivable that when the porous layer 3 is partially exposed by the abrasion of the sliding layer 4, the hard particles dispersed in the matrix phase receive a higher load than soft bronze that is the matrix phase. When the hard Laves phase constituted of a composition of Co, Mo, and Si is deposited on the frictional surface to support the load, the hard particles can however act on a reduction in the abrasion of the porous layer 3 advantageously. Also, if the hard particle powder 4a is dispersed in the sliding layer 4, the same effect as the above can be obtained on the exposure of the hard particle powder 4a by the abrasion of the sliding layer 4.

In the present embodiment, Mo in the Laves phase and S in lubricating oil can form a sulfide film of $MoS_2$ on the frictional surfaces. $MoS_2$ is a material known as a sulfide that contributes to improvement in frictional characteristics instead of the solid lubricity of lead. Since a bond between sulfur atoms is weaker than a bond between molybdenum atoms and a bond between a molybdenum atom and a sulfur atom, friction selectively cleaves bonds between sulfur atoms, this leads to lubrication, which can act on abrasion suppression effectively. A Mo oxide generated on the frictional surface by the oxidation of Mo in the Laves phase during the sliding also exhibits a lubrication effect, and can act on abrasive suppression effectively.

If the porous layer 3 contains the hard particles, for example, the content of the hard particles may be 40% by mass or less per 100% by mass of the whole porous layer 3. The content of the hard particles may be, for example, 0.1% by mass or more per 100% by mass of whole sliding layer 3. If the content of the hard particles 11 is 0.1% by mass or more, the effect of reducing the abrasion of the porous layer 3 as described above is obtained. The content of the Laves phase constituted of a composition of Co, Mo, and Si may be, for example, 0.1 to 20% by mass per 100% by mass of whole sliding layer 3. As described below, if the hard particle powder 4a is dispersed in the sliding layer 4, and the porous layer 3 does not contain the hard particles, the total content of Cu and Sn may be 99.9% or more per 100% by mass of the whole porous layer 3.

The porous layer 3 may further have compound phases dispersed in the matrix phase 10.

The compound phases contain Co, Fe, Ni, Si, and Cr. The formation the compound phases in the matrix phase enables enhancing the hardness of the matrix phase, and enables acting on improvement in the seizure resistance advantageously.

The porous layer 3 is impregnated with a resin composition at a predetermined thickness, and the resin composition with which the porous layer 3 is impregnated is fired to form the sliding layer 4. The average thickness of the sliding layer 4 (thickness from the surface of the metal substrate 2) may be set at a greater thickness than that of the porous layer 3 so that the porous layer 3 is not exposed.

The resin composition of the sliding layer 4 contains a fluorine resin as the main ingredient. As the fluorine resin to be the base resin of the resin composition, for example, PTFE (polytetrafluoroethylene), PFA (perfluoroalkoxy alkane), FEP (perfluoroethylene-propene copolymer), EFFE (ethylene-tetrafluoroethylene copolymer), and the like may be used.

The resin composition may contain PTFE, which is a fluorine resin, as the main ingredient and contain another fluorine resin such as PFA than PTFE as an additive optionally. The content of the other fluorine resin contained as the optional component may be 0% by volume or more and 20% by volume or less of the resin composition.

Examples of marketed PTFE resins include POLYFLON® D-210C and F-201 (produced by DAIKIN INDUSTRIES, LTD.), Fluon® AD911D (produced by AGC Inc.), and Teflon® 31JR and 6C-J (produced by Chemours-Mitsui Fluoroproducts Co., Ltd.).

Figure 4:
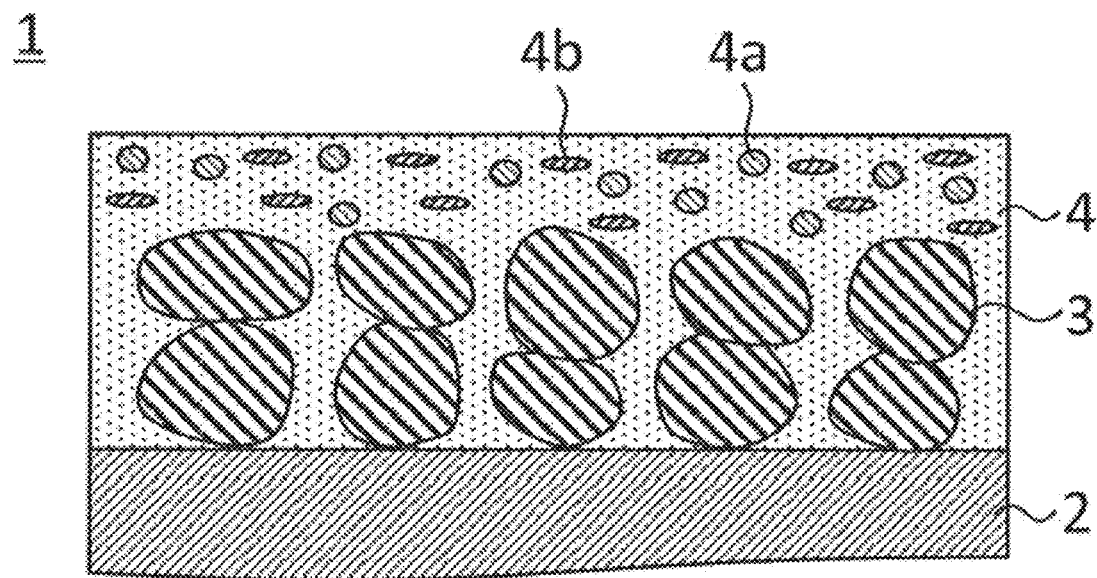
FIG. 4 is a longitudinal section showing a schematic structure of a sliding member according to another variation of one embodiment.

As shown in FIG. 4 as a variation, one or more of hard particle powder 4a containing a Laves phase constituted of a composition of Co, Mo and Si, molybdenum disulfide ($MoS_2$) powder 4b, and bronze powder not containing a Laves phase may be dispersed in the resin composition of the sliding layer 4. If the porous layer 3 does not contain the hard particles, it is essential that the hard particle powder 4a be dispersed in the sliding layer 4.

Figure 5A:
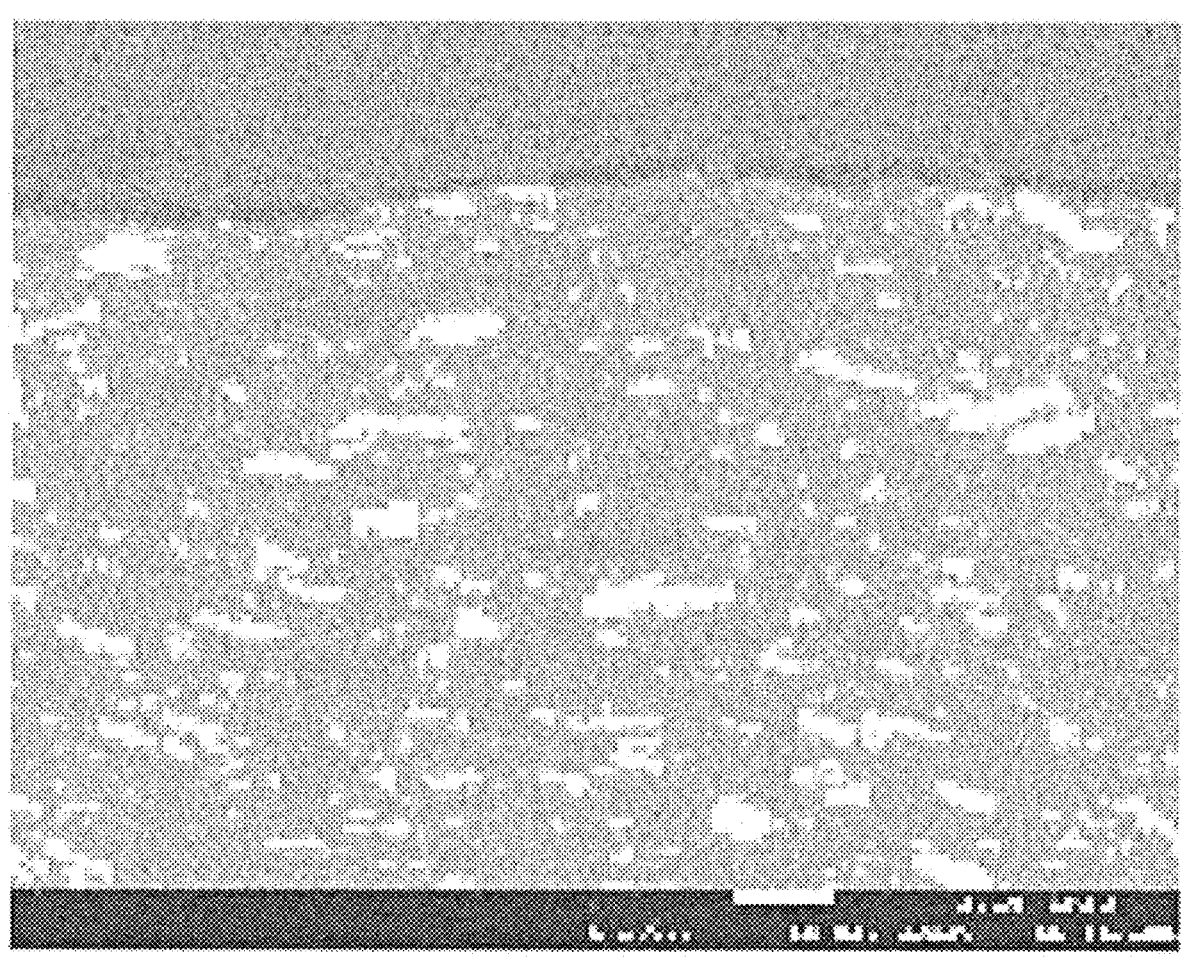
FIG. 5A is a reflected electron composition image of a sectional structure of the sliding layer of a sliding member according to a first variation of one embodiment.
Figure 5B:
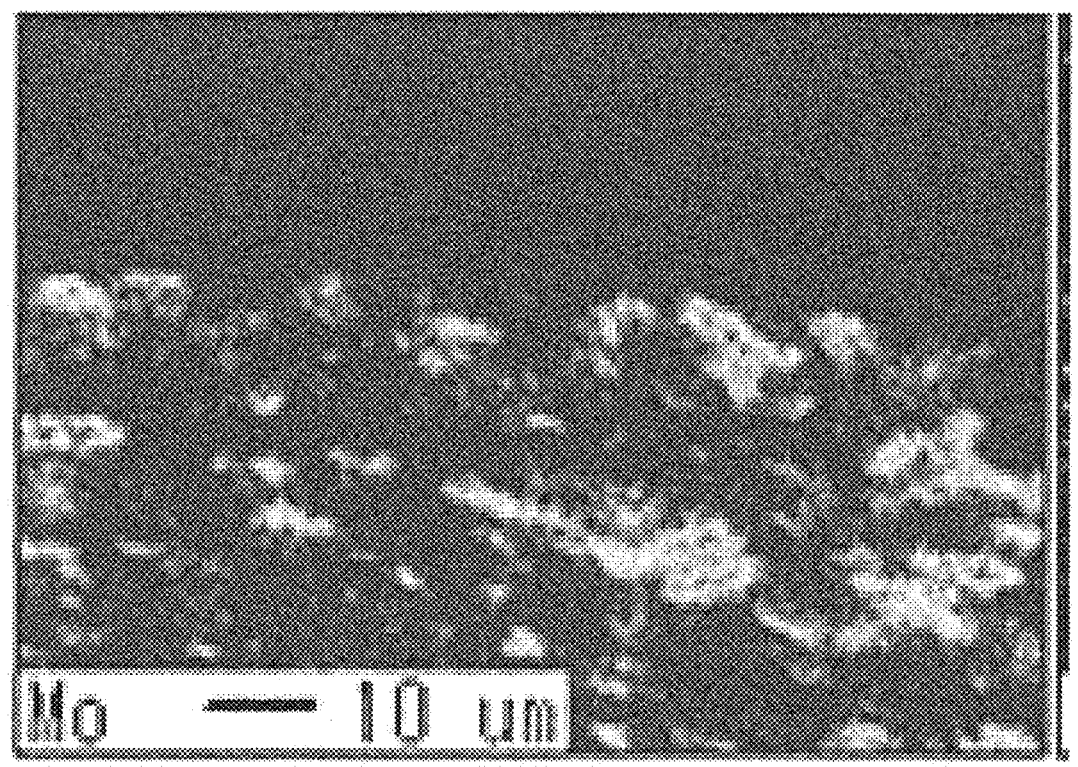
FIG. 5B is a mapping image of Mo in a sectional structure of the sliding layer of the sliding member according to the first variation of the one embodiment by EPMA.
Figure 5C:
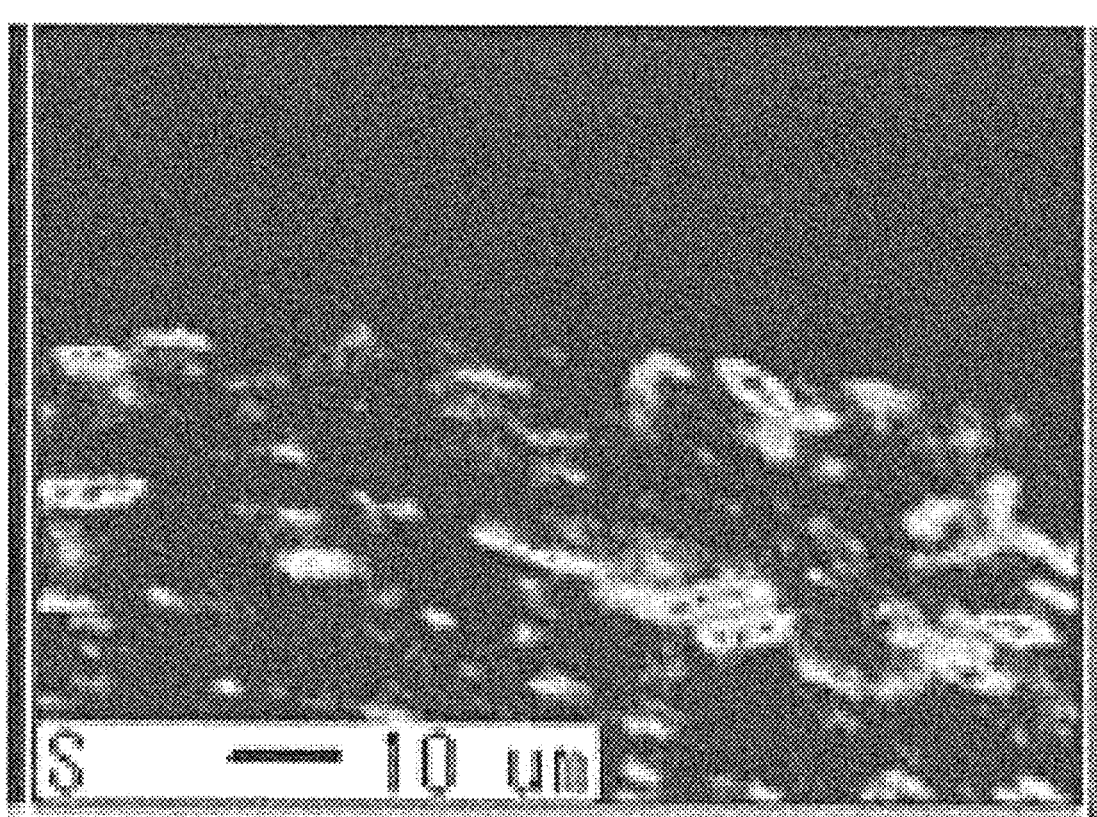
FIG. 5C is a mapping image of S in a sectional structure of the sliding layer of the sliding member according to the first variation of the one embodiment by EPMA.

FIG. 5A is a reflected electron composition image of a sectional structure of the sliding layer 4 in which molybdenum disulfide powder 4b is dispersed in the resin composition, FIG. 5B is a mapping image of Mo by EPMA, and FIG. 5C is a mapping image of S by EPMA. As described above, $MoS_2$ is a material known as a sulfide that exhibits solid lubricity instead of lead to contribute to improvement in friction characteristics. Since bonds between sulfur atoms are weaker than bonds between molybdenum atoms or bonds between molybdenum atoms and sulfur atoms, the friction of $MoS_2$ selectively breaks bonds between sulfur atoms, resulting in lubrication, so that $MoS_2$ can act on the suppression of the abrasion effectively.

Figure 6A:
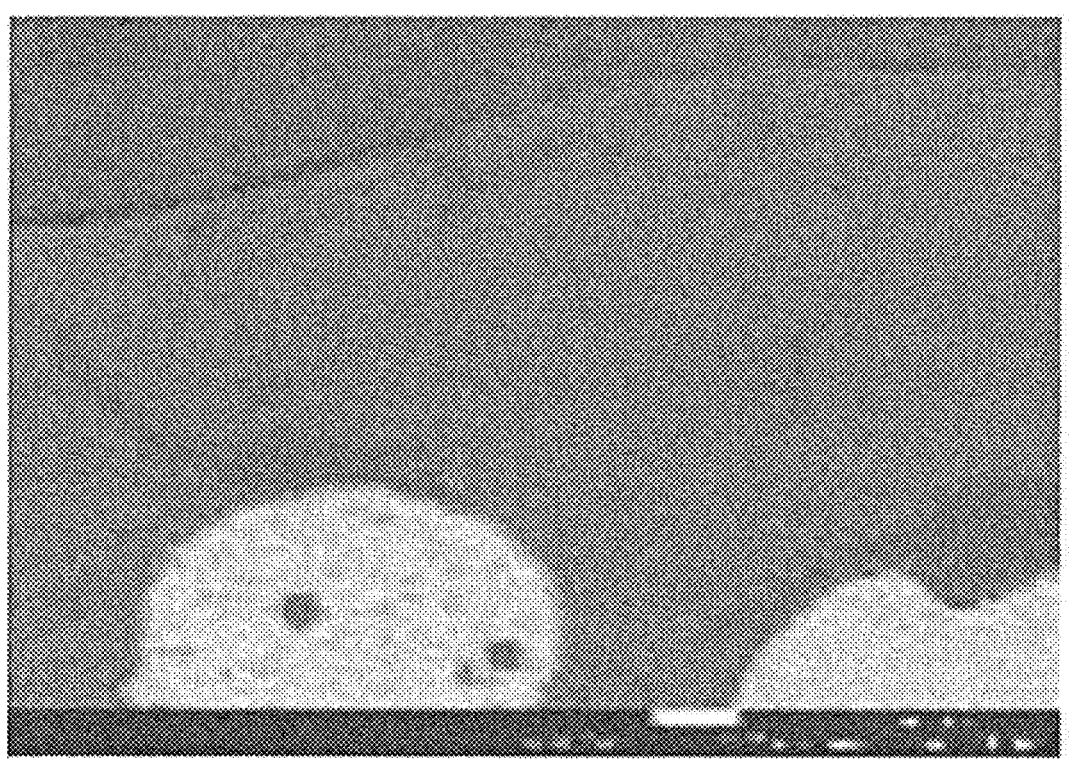
FIG. 6A is a reflected electron composition image of a sectional structure of the sliding layer of a sliding member according to a second variation of one embodiment.
Figure 6B:
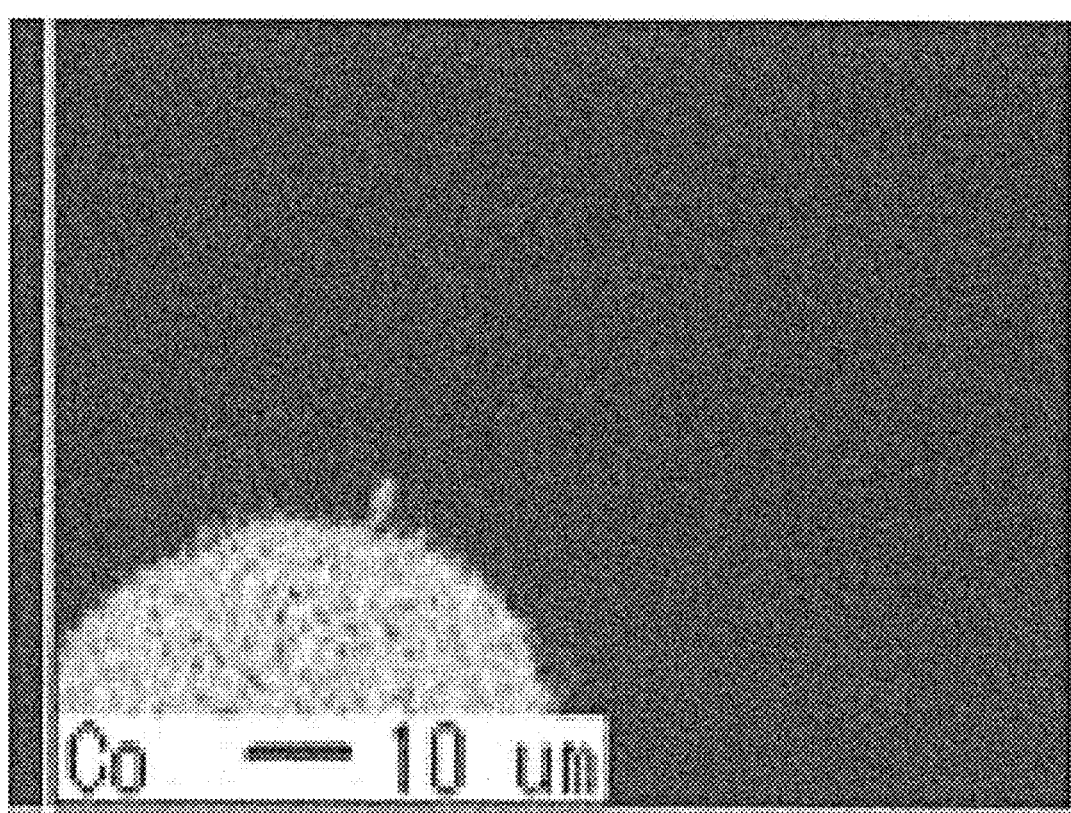
FIG. 6B is a mapping image of Co in a sectional structure of the sliding layer of the sliding member according to the second variation of the one embodiment by EPMA.
Figure 6C:
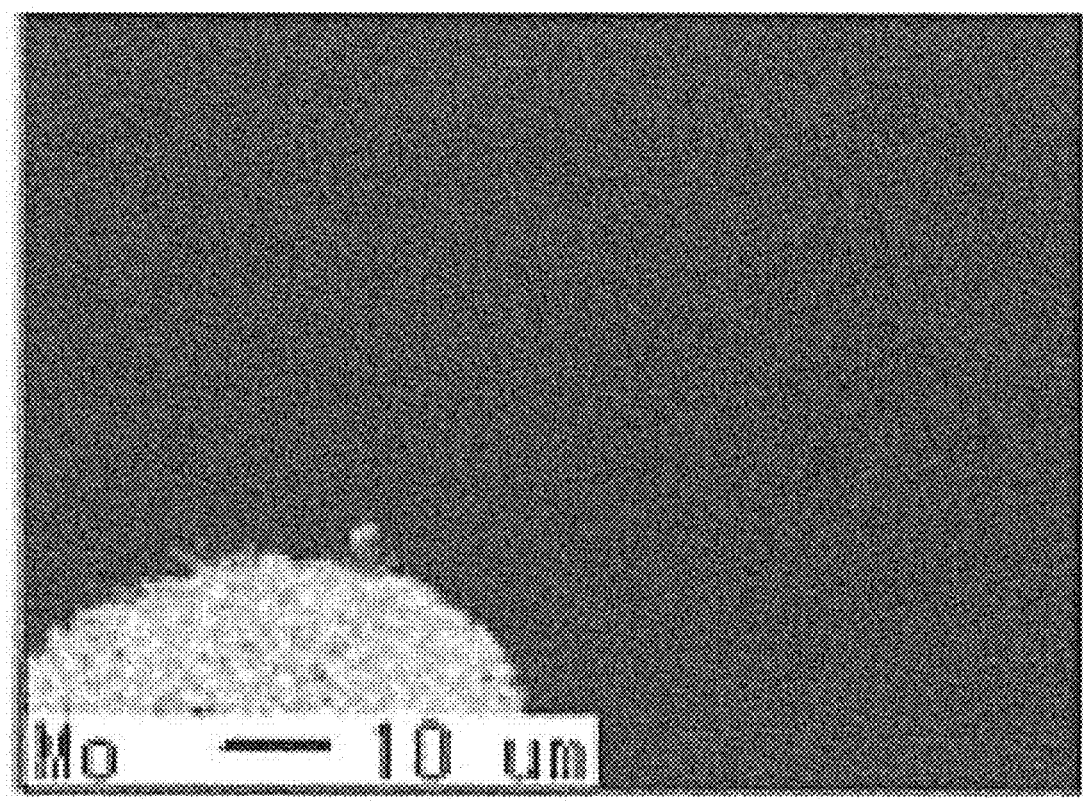
FIG. 6C is a mapping image of Mo in a sectional structure of the sliding layer of the sliding member according to the second variation of the one embodiment by EPMA.
Figure 6D:
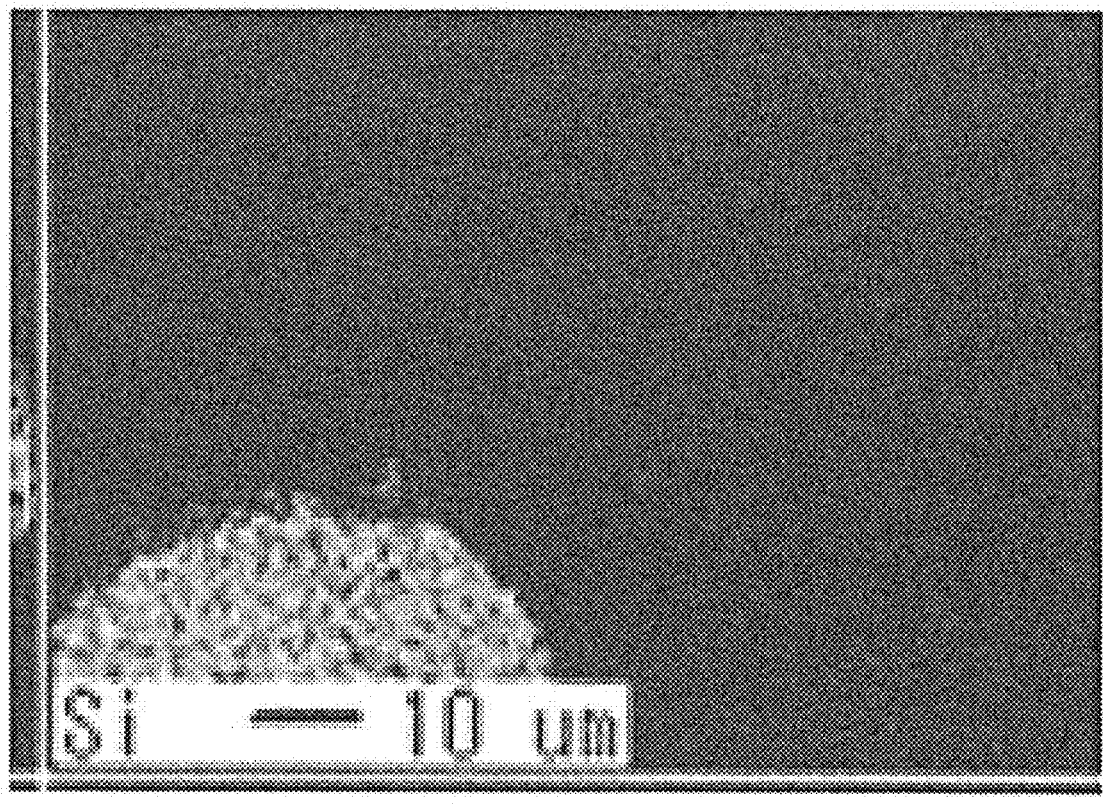
FIG. 6D is a mapping image of Si in a sectional structure of the sliding layer of the sliding member according to the second variation of the one embodiment by EPMA.

FIG. 6A is a reflected electron composition image of a sectional structure of the sliding layer 4 in which the hard particle powder 4a is dispersed in the resin composition, FIG. 6B is a mapping image of Co by EPMA, and FIG. 6C is a mapping image of Mo by EPMA, and FIG. 6D is a mapping image of Si by EPMA. Although it is conceivable that the hard particle powder 4a dispersed in the sliding layer 4 receives a higher load than the resin composition forming the sliding layer 4, the hard Laves phase constituted of a composition of Co, Mo and Si can be deposited on the frictional surface to support the load, resulting in acting on a reduction in the abrasion of the sliding layer 4 advantageously.

As another variation, the resin composition of the sliding layer 4 may contain any of zinc compounds (ZnS (zinc sulfide), ZnO (zinc oxide), $ZnSO_4$ (zinc sulfate), and the like), carbon fiber, iron oxide, barium sulfate, aramid fiber, graphite, calcium compounds ($CaCO_3$ (calcium carbonate), $CaSO_4$ (calcium sulfate), Ca $(OH)_2$ (calcium hydroxide), and the like), zinc, zinc alloys or a plurality thereof as an optional additive or optional additives. Incorporating a zinc compound into the resin composition enables improving the elastic modulus to suppress the deformation of the sliding layer 4 due to external force, resulting in suppressing an increase or a decrease in the contact area. Incorporating carbon fiber into the resin composition enables improving the value of the kinetic frictional force and change in the static frictional force and the kinetic frictional force, resulting in improvement in sliding characteristics. Incorporating iron oxide into the resin composition enables improving the elastic modulus in addition to the abrasion resistance. Incorporating barium sulfate or aramid fiber into the resin composition enables enhancing the abrasion resistance without inhibiting the addition of a zinc compound from improving the elastic modulus. Incorporating graphite into the resin composition enables reducing the frictional resistance without inhibiting the addition of a zinc compound from improving the elastic modulus. Incorporating a calcium compound, zinc, or a zinc alloy into the resin composition enables improving the abrasion resistance without inhibiting the addition of a zinc compound from improving the elastic modulus.

The ratio of the thickness of the porous layer 3 to the thickness of the sliding layer 4 may be 6:4 to 8:2, for example, 7:3.

The sliding member 1 according to the present embodiment includes the following three aspects:

(1) an aspect in which the porous layer 3 contains the hard particles, and the sliding layer 4 does not contain the hard particle powder 4a;

(2) an aspect in which the porous layer 3 does not contain the hard particles, and the sliding layer 4 contains the hard particle powder 4a; and (3) an aspect in which the porous layer 3 contains the hard particles, and the sliding layer 4 contains the hard particle powder 4a.

In any of the aspects (1) to (3), the sum of the content of the hard particles and the content of the hard particle powder 4a may be 1 to 20% by mass, for example, 15% by mass, per 100% by mass in total of the porous layer 3 and the sliding layer 4 (namely the remainder obtained by excluding the metal substrate 2 from the whole sliding member 1).

<Configuration of Bearing>

Figure 7:
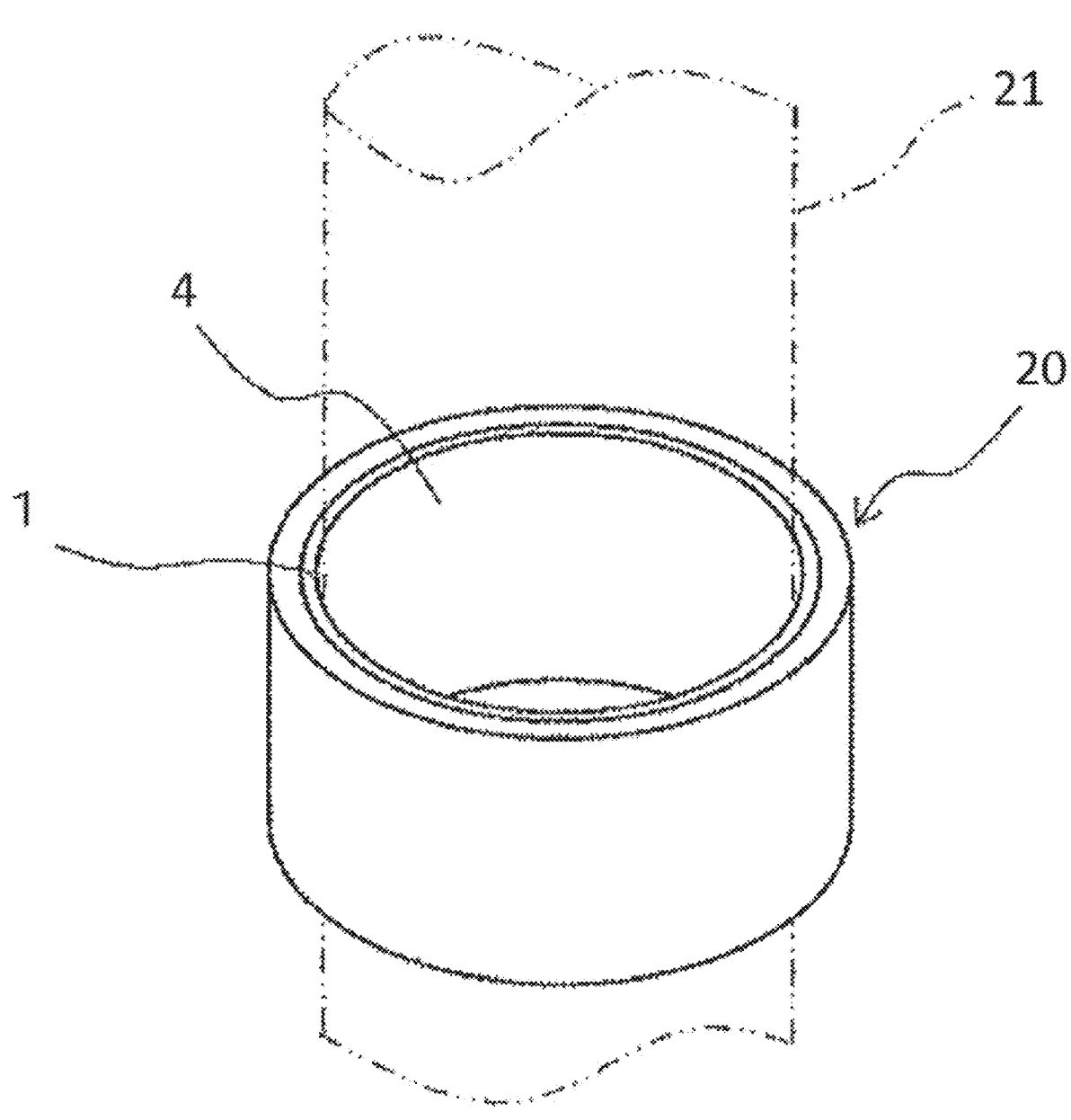
FIG. 7 is a perspective view showing a schematic configuration of a bearing according to one embodiment.

Then, the configuration of a bearing 20 according to one embodiment will be described. FIG. 7 is a perspective view showing the schematic configuration of the bearing 20 according to one embodiment. As shown in FIG. 7, for example, the bearing 20 is a plain bearing, and is constituted in an annular shape with the sliding layer 4 of the sliding member 1 having the configuration described above on an inside. The bearing 20 supports a shaft 21 that is an object to be slid in the sliding layer 4 forming a cylindrical inner periphery.

Even though the shaft 21 has either a form that moves rotationally or a form that moves linearly, the bearing 20 is applicable. For example, the bearing 20 may be used for sliding portions of shock absorbers and the like for cars and the like having forms that move linearly and using oil. The bearings 20 may be used for sliding portions of gear pumps, which send out oil by rotating gear-formed members, having forms that move rotationally and using oil. Examples of another form of the bearing according to the present embodiment also include rolling bearings to be used in transmissions and the like.

<Method for Manufacturing Sliding Member and Bearing>

Then, a method for manufacturing a sliding member 1 and a bearing 20 according to the present embodiment will be described with reference to FIG. 8. FIG. 8 is a figure showing a process for manufacturing the sliding member 1.

As shown in FIG. 8, a first powder containing Cu and Sn and a hard particle powder containing a Laves phase constituted of a composition of Co, Mo, and Si are first mixed to produce mixed powder (step S10). A second powder containing Cu, Co, Fe, Ni, Si, and Cr may be further mixed in addition to the first powder and the hard particle powder to produce mixed powder.

Here, the first powder is a bronze-based alloy powder containing Cu as the main ingredient and further containing Sn. The first powder may further contain Bi or P. If the first powder contains Bi, Bi particles are deposited in a matrix phase 10 at the time of the sintering of the mixed powder described below (namely, step S12), Bi exhibits self-lubrication action in the same way as Pb in the conventional lead bronze, friction can therefore be reduced. If the first powder contains P, oxygen contained in copper can be removed (deoxidized) to suppress hydrogen embrittlement. The contents of the constituent elements of the first powder may be Sn: 10 to 11% by mass and Cu: the balance. If the first powder further contains Bi, Bi: 7 to 9% by mass. If the first powder contains P, it is preferable that P: 0.02% by mass or less. The amount of the first powder blended in the mixed powder is the amount of the balance obtained by deducting the total amount of powders blended other than the first powder from the amount of the whole mixed powder blended.

The hard particle powder is an alloy powder containing a Laves phase constituted of a composition of Co, Mo, and Si and Cu, and is a hard particle powder containing Cu, Si, Fe, Mo, Co and Cr. The hard particle powder may further contain Sn, and for example, may contain Sn at 1% by mass or more. The solid phase temperature of the hard particle powder not containing Sn reaches around 1450° C., but the incorporation of Sn enables reducing the solid phase temperature of the hard particle powder, and enables solid phase-sintering the hard particle powder on a back metal base material at around 800° C. Sn contained in the hard particle powder is dissolved on a Cu—Sn matrix phase side formed by the first powder for diffusion bonding at the time of sintering. The progress of the sintering due to the powdery shrinkage through Sn enables exhibiting solid solution strengthening by Sn in the matrix phase and Sn contained in the hard particle powder. The contents of the constituent elements in the hard particle powder may be Co: 14 to 20% by mass, Mo: 24 to 28% by mass, Si: 3 to 7% by mass, Fe: 2 to 16% by mass, Cr: 1 to 10% by mass, and Cu: the balance, per 100% by mass of the whole hard particle powder. If the hard particle powder contains Sn, the contents of the constituent elements in the hard particle powder may be Co: 14 to 20% by mass, Mo: 24 to 28% by mass, Si: 3 to 7% by mass, Fe: 2 to 16% by mass, Cr: 1 to 10% by mass, Sn: 1 to 15% by mass, and Cu: the balance with the content of the whole hard particle powder defined as 100% by mass. The amount of the hard particle powder blended may be 1 to 40% by mass, and is preferably 1 to 3% by mass, per 100% by mass of the whole mixed powder (namely, 100% by mass of the whole sliding layer 3). Since Cu and Sn are molten out of the hard particle powder during the sintering, the content of the hard particles in the sliding layer 3 varies from the amount of the hard particle powder blended in the mixed powder.

The second powder is an alloy powder containing Cu as the main ingredient and further containing Co, Fe, Ni, Si, and Cr. The second powder may further contain Sn, and, for example, may contain Sn at 1% by mass or more. The solid phase temperature of the second powder not containing Sn reaches around 1240° C., but the incorporation of Sn enables reducing the solid phase temperature of the second powder, and enables solid phase-sintering the second powder on the back metal base material at around 800° C. If the second powder contains Sn, the contents of the constituent elements in the second powder may be Co: 0.6 to 4.6% by mass, Fe: 1.6 to 5.6% by mass, Ni: 10 to 14% by mass, Si: 0.5 to 4.5% by mass, Cr: 0.5 to 1.5% by mass, Sn: 1 to 15% by mass, and Cu: the balance with the content of the whole second powder defined as 100% by mass. If the second powder is contained in mixed powder, the amount of the second powder blended may be 2 to 38% by mass, and is preferably 10 to 38% by mass and more preferably 17 to 19% by mass with the content of the whole mixed powder defined as 100% by mass.

The amount of the hard particle powder blended is 1 to 40% by mass, and the amount of the second powder blended may be 15 to 18% by mass, per 100% by mass of the whole mixed powder. In this case, excellent shearing workability can be achieved.

The first powder, the hard particle powder, and the second powder can each be produced, for example, by spraying using gas atomization. In the gas atomization, the heat source for melting may be high-frequency waves, and zirconia may be used for the crucible (with a nozzle attached to the bottom).

For example, the grain diameter of the first powder may be 45 μm to 180 μm. The hard particle powder may be fine powder having a grain diameter of 53 μm or less. The grain diameter of the second powder may be 53 μm to 150 μm. Here, the "grain diameter" refers to particle size distribution measured by laser diffraction/scattering using the particle size distribution measuring apparatus MT3300EXII, manufactured by MicrotracBEL Corp. This measuring method is a measuring method according to the test procedure including the step of extracting powder from paste and the following in "4.2.3 Laser diffraction grain size distribution measurement test" of JIS Z3284-2.

As shown in FIG. 8, mixed powder containing the first powder and the hard particle powder is then sprinkled on one surface of the metal substrate 2 (step S11). The mixed powder may contain the second powder. In step S11, the alloy powder into which the mixed powder is formed by the atomization treatment at the time of spraying the mixed powder may be sprinkled on one surface of the metal substrate 2. The mixed powder (or alloy powder) sprinkled on the metal substrate 2 is sintered at 800 to 900° C. to form the porous layer 3 (step S12). As described above, the solid phase temperatures of the hard particle powder not containing Sn and the second powder reach around 1450° C. and 1240° C., respectively, but the incorporation of Sn enables reducing the solid phase temperatures of the hard particle powder and the second powder, and enables solid phase-sintering the hard particle powder and the second powder on the metal substrate 3 (back metal base material) at around 800° C. Sn contained in the hard particle powder is dissolved in the Cu—Sn matrix phase side formed by the first powder during sintering for diffusion bonding. The progress of the sintering due to powdery shrinkage through Sn exhibits solid solution strengthening by Sn in matrix phase and Sn contained in the hard particle powder, and enables forming an alloy having high strength finally.

As shown in FIG. 8, a predetermined amount of a resin composition is then fed onto the porous layer 3 formed on the surface of the metal substrate 2 and pressed to the porous layer 3 to impregnate the porous layer 3 with the resin composition (step S13). One or more of the hard particle powder 4a containing a Laves phase constituted of a composition of Co, Mo and Si and molybdenum disulfide (MoS₂) powder 4b may be dispersed in the resin composition to be fed onto the porous layer 3. The resin composition is fed onto the porous layer 3 in such an amount that the sliding layer 4 covers the porous layer 3 at such thickness that the porous layer 3 is not exposed from the surface of sliding layer 4 after the below-described firing of the resin composition.

The resin composition is next heated at temperature exceeding the melting point of the resin contained in the resin composition to volatilize the organic solvent while melting the resin, and the resin is then cured to form sliding layer 4 (step S14). The heating the resin composition at a predetermined temperature to form the sliding layer 4 is referred to as firing. Note that the polytetrafluoroethylene for the resin has a melting point of 327° C. In the example shown in FIG. 8, the resin composition is heated at temperature exceeding the melting points of the polytetrafluoroethylene (for example, 400 to 500° C.) with a firing furnace to fire the sliding layer 4.

As shown in FIG. 8, the metal substrate 2 having the porous layer 3 and the sliding layer 4 formed thereon is then rolled (step S15). The sliding member 1 having the configuration described above (refer to FIG. 1 to FIG. 4) is manufactured thereby. A bearing 20 having the configuration described above (refer to FIG. 7) is manufactured by then processing the rolled metal substrate (sliding member 1) into a wound bush shape with the sliding layer on an inside.

EXAMPLES

Specific examples according to the present embodiment will then be described.

(Manufacturing of Specimen)

The present inventors first produced samples of first powder, hard particle powder, and second powder at mass ratios between chemical components shown in the following table 1 by spraying using gas atomization, respectively. That is, the sample of the first powder is constituted of a composition in which the content of Sn is 10.75% by mass, the content of P is less than 0.1% by mass, and the content of Cu is the balance. The sample of the hard particle powder is constituted of a composition in which the content of Sn is 4.5% by mass, the content of Si is 5% by mass, the content of Fe is 15% by mass, the content of Co is 16% by mass, the content of Cr is 4% by mass, the content of Mo is 26% by mass, and the content of Cu is the balance. The sample of the second powder is constituted of a composition in which the content of Sn is 7.8% by mass, the content of Ni is 12% by mass, the content of Si is 2.5% by mass, the content of Fe is 3.6% by mass, the content of Co is 2.6% by mass, the content of Cr is 1% by mass, and the content of Cu is the balance.

TABLE 1

Composition ratio and blended amounts in powder
to be sintered for porous layer (unit: % by mass)

| | Mixed powder | | | Alloy powder | |
| --- | --- | --- | --- | --- | --- |
| | A<br>First<br>powder | B<br>Hard<br>particle<br>powder | C<br>Second<br>powder | Calculated<br>value<br>0.8A + 0.02B +<br>0.18C | Measured<br>value |
| Sn | 10.75 | 4.5 | 7.8 | 10.1 | 10.07 |
| P | <0.1 | — | — | — | — |
| Ni | — | — | 12 | 2.2 | 2.17 |
| Si | — | 5 | 2.5 | 0.55 | 0.54 |
| Fe | — | 15 | 3.6 | 0.95 | 0.97 |
| Co | — | 16 | 2.6 | 0.79 | 0.76 |
| Cr | — | 4 | 1 | 0.26 | 0.24 |
| Mo | — | 26 | — | 0.52 | 0.51 |
| Cu | bal | bal | bal | bal | bal |
| Ratio | 80 | 2 | 18 | — | — |

The specimens of Examples 1 to 8 were then manufactured in the following procedure. That is, the samples of the first powder, the hard particle powder, and the second powder were mixed at a mass ratio of 80:2:18 to produce mixed powder. The mixed powder was then formed into alloy by atomization treatment at the time of the spraying of the mixed powder to produce alloy powder. The alloy powder has a grain diameter of 53 to 180 μm. Since acicular particles were mixed in the particles of the alloy powder at the time of the spraying, the particles of the alloy powder were classified through a sieve to remove the acicular particles. The remaining powder was sprinkled on the back metal base material SS400 and sintered at a sintering temperature of 870° C. for a sintering time of 60 minutes to form a porous layer. Table 1 above shows the blending ratio between the first powder, the hard particle powder, and the second powder in the mixed powder, and the calculated value and the measured value of the composition ratio of the alloy powder (powder to be sintered) for forming the porous layer.

The porous layer was next impregnated with a resin composition in which graphite powder (the description thereof is omitted in the following Table 2) was further mixed at 2% by volume into each resin composition having a composition shown in the following Table 2. The resin composition was then fired to form a sliding layer covering the porous layer, followed by rolling. The specimens of Examples 1 to 8 were manufactured thereby. All the sliding layers of Examples 1 to 8 therefore contain the graphite powder. FIGS. 3A to 3E show a reflected electron image of a sectional structure of the porous layer in the specimen of Example 1 and mapping images of Sn, Co, Mo, and Si by EPMA, respectively.

The specimen of Example 9 was manufactured in the following procedure. That is, only the first powder was sprinkled on the back metal base material SS400 and sintered at a sintering temperature of 870° C. for a sintering time of 60 minutes to form a porous layer. The porous layer was next impregnated with a resin composition in which graphite powder (the description thereof is omitted in the following Table 2) was further mixed at 2% by volume into a resin composition having a composition shown in the following Table 2. The resin composition was then fired to form a sliding layer covering the porous layer, followed by rolling. The specimen of Examples 9 was manufactured.

TABLE 2

Composition of resin composition for forming sliding layer

| | Resin composition | Additive |
| --- | --- | --- |
| Example 1 | PTFE resin | — |
| Example 2 | PTFE resin | $MoS_2$ powder: 1% by mass |
| Example 3 | PTFE resin | $MoS_2$ powder: 5% by mass |
| Example 4 | PTFE resin | $MoS_2$ powder: 10% by mass |
| Example 5 | PTFE resin | Hard particle powder: 1% by mass |
| Example 6 | PTFE resin | Hard particle powder: 5% by mass |
| Example 7 | PTFE resin | Hard particle powder: 10% by mass |
| Example 8 | PTFE resin | Hard particle powder: 15% by mass |
| Example 9 | PTFE resin | Hard particle powder: 15% by mass |

LBC3 was sintered on the back metal base material SS400, followed by rolling in the same way to manufacture the specimen of Comparative Example 1. Bronze powder having a grain size of 180 μm or less and containing Sn: 10 to 11.5%, P: 0.1% or less, and Cu: the remainder was sprinkled on the back metal base material (carbon steel) and then sintered at a sintering temperature of 870° C. for a sintering time of 60 minutes to form a porous layer (not containing hard particles). The porous layer was then impregnated with a resin composition having the following composition, and the resin composition was then fired to form a sliding layer covering the porous layer, followed by rolling, and the specimen of Comparative Example 2, which was a resin compound bearing, was manufactured.

The blending ratio (% by volume) of the resin composition of Comparative Example 2 is as follows:

PTFE resin: 98% and graphite: 2%

All the specimens of Examples 1 to 8 and Comparative Examples 1 and 2 have a size of 40 mm×40 mm×1 mm in plate thickness (lining thickness: 0.3 mm and back metal thickness: 0.7 mm). The lining thickness used here means the length in the thickness direction from the surface of the back metal to the surface of the sliding layer (the resin layer in the cases of Examples 1 to 8 and Comparative Example 2 or LBC3 in the case of Comparative Example 1).

(Evaluation Tests)

The evaluation tests described below were then performed to compare the seizure resistances and the abrasion resistances of the specimens of Examples 1 to 9 and Comparative Examples 1 and 2.

Figure 9:
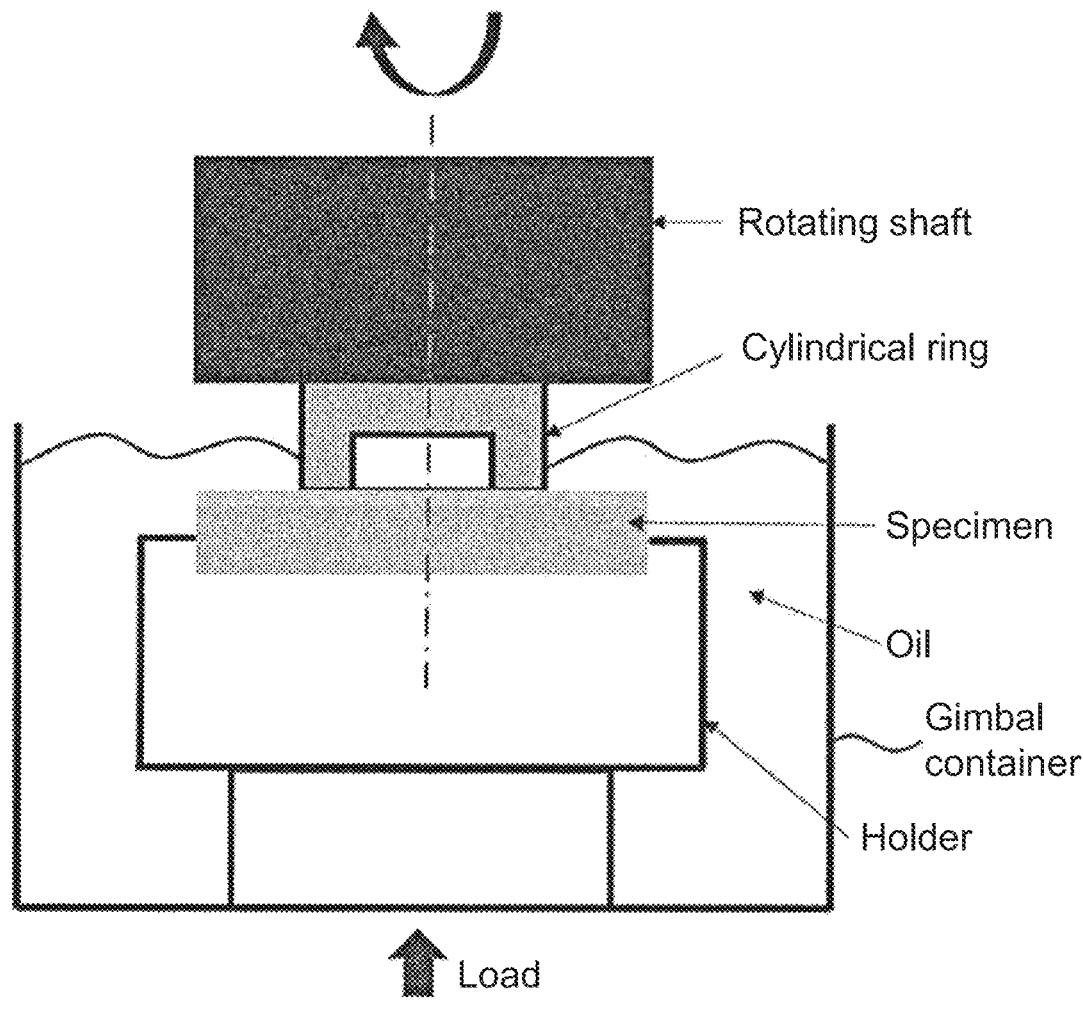
FIG. 9 shows a schematic configuration of a thrust tester.

A thrust tester shown in FIG. 9 was used in this evaluation. A hydraulic fluid (Trade name: VG32) was used as the oil to be used. The amount of the oil in a gimbal container was 250 cc, the opposite cylindrical ring has an outer diameter of φ30 and an inner diameter of φ24. This evaluation is an evaluation test in oil, but belongs to an evaluation in a boundary lubrication environment in which an oil film is hardly actually formed since a cylindrical ring and the bearing metal are in full sliding contact without any space therebetween.

(1) Seizure Resistance Evaluation

The limit PV value is used for determining the applicable range as an index for indicating the limit of the load capacity of a bearing. The present inventors noticed the linear relationship was obtained between pPV and T (lubricating oil temperature) as a method for determining the limit PV level of a bearing. The pPV value at the deterioration starting temperature of the lubricating oil (80° C.) was calculated, and the PV value was further analyzed from the then obtained coefficient of friction p. When the limit PV curve was drawn, tests was performed at three levels, namely circumferential speeds of 0.2 m/s, 1 m/s, and 3 m/s. The burden was set at a step load of 0.6 MPa/30 s, and a load when the coefficient of friction reached 0.5 or when the temperature on the rear side of the specimen reached 200° C. was divided by a friction cross-sectional area of 254 mm$^2$ to calculate a value. The value was defined as seizure contact pressure. The opposite material was carbonitrided S45C, which was hard and tough, subjected to polish-finishing to a surface roughness, Ra, of 0.17 μm.

(2) Abrasion Resistance Evaluation

Abrasion tests were performed under the operating conditions of a total of six levels obtained in combination of constant contact pressures of 1 MPa, 5 MP, and 10 MPa and constant circumferential speeds of 0.2 m/s and 3 m/s (conditions under which the specimens were almost saturated and conditions under which the specimens generated heat within a short period of time). Although the continuous operating time was set basically at 1 hr and further set so that the limiter functioned to stop the tester when the temperature on the rear side of the specimen reached 200° C. A cylindrical ring made of the carbonitriding-treated S45C, described in the above-mentioned seizure resistance evaluation, was used as the opposite material. The sliding contact surface was polish-finished to a surface roughness, Ra, of 0.17 μm.

(Results and Discussion)

Figure 10:
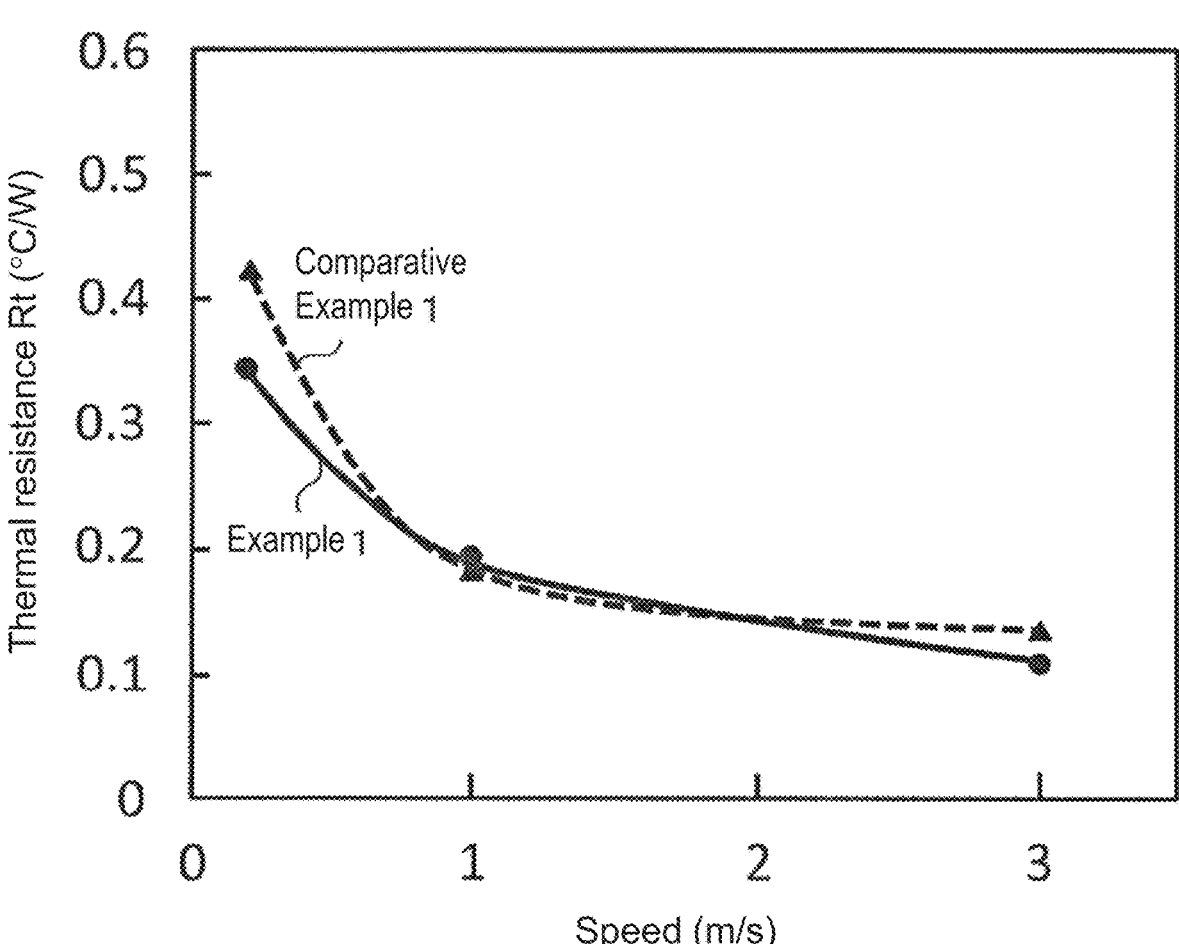
FIG. 10 is a graph showing the thermal resistances vs. the circumferential speeds of the specimens of Example 1 and Comparative Example 1.
Figure 11:
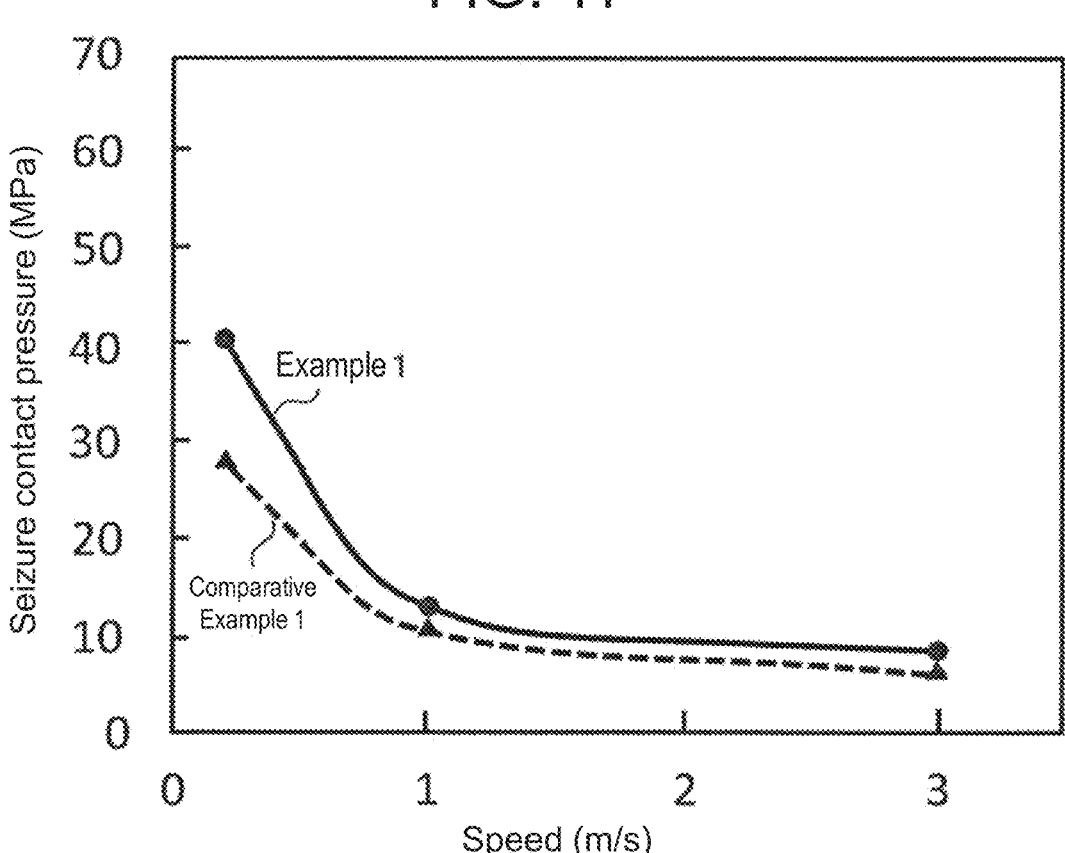
FIG. 11 is a graph showing the limit pressure-velocity (PV) curves of the specimens of Example 1 and Comparative Example 1.

FIG. 10 shows the measured value of the thermal resistance vs. the circumferential speed of the specimens of Example 1 and Comparative Example 1, and FIG. 11 shows the limit PV curves. The thermal resistance was found from the gradient of the linear approximation straight line obtained from the amount of frictional heat generated on the contact surface Q and the temperature of the lubricating oil at each circumferential speed. The amount of frictional heat generated Q was analyzed from the load, the speed, and the coefficient of friction by the following expression (1):

$$Q = \mu w V \qquad (1)$$

wherein Q is the amount of frictional heat generated on the contact surface (N·m/s=J/s=W), w was the load (N), V was the speed (m/s), and μ is the coefficient of friction on the contact surface.

As shown in FIGS. 3C to 3E, the specimen of Example 1 contains the hard particles containing a Laves phase constituted of a composition of Co, Mo and Si in the porous layer. As mentioned above, the specimen of Example 1 includes the sliding layer comprising PTFE and graphite powder and not containing MoS$_2$ powder or hard particle powder. It was confirmed with reference to FIG. 11 that the specimen of Example 1 generally had a higher PV value than the specimen of Comparative Example 1, and was improved in seizure resistance. It was confirmed with reference to FIGS. 10 and 11 that the specimen of Example 1 had a lower thermal resistance than the specimen of Comparative Example 1, the seizure contact pressure reached a value equal to or higher than 40 MPa, which was 1.35 times higher than that of the specimen of Comparative Example 1, in the low-speed range of a circumferential speed of 0.2 m/s, and the specimen of Example 1 exhibited excellent seizure resistance performance.

Figure 12:
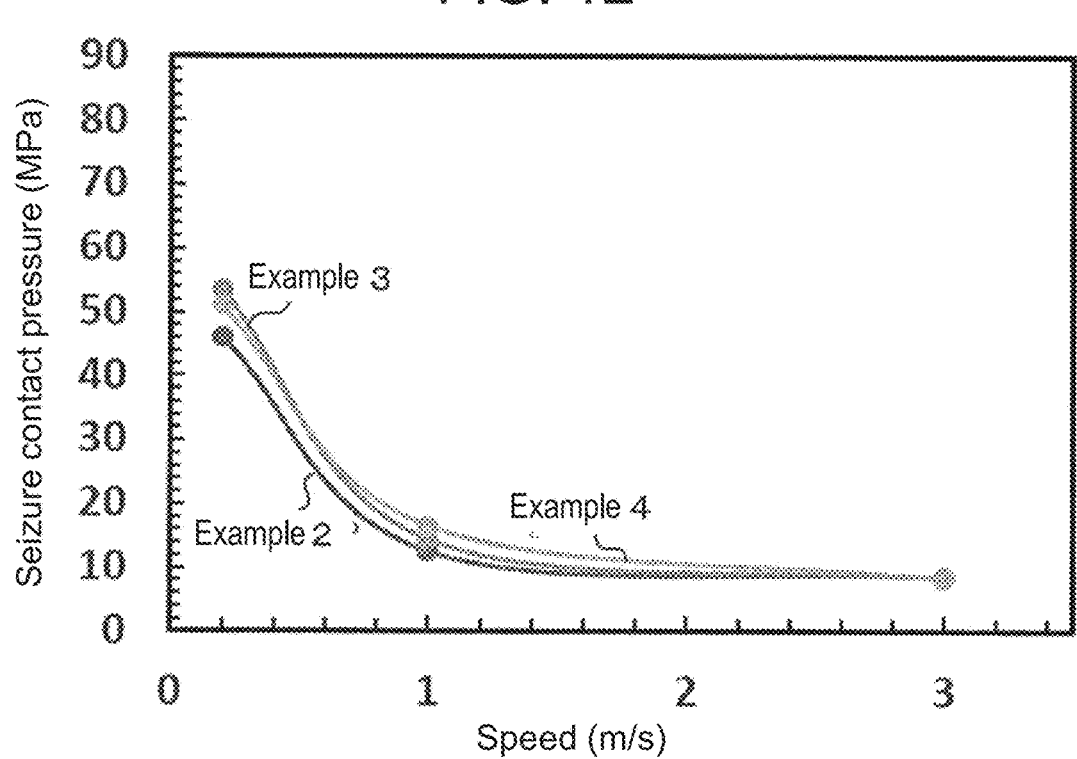
FIG. 12 is a graph showing the limit PV curves of the specimens of Examples 2 to 4.
Figure 13:
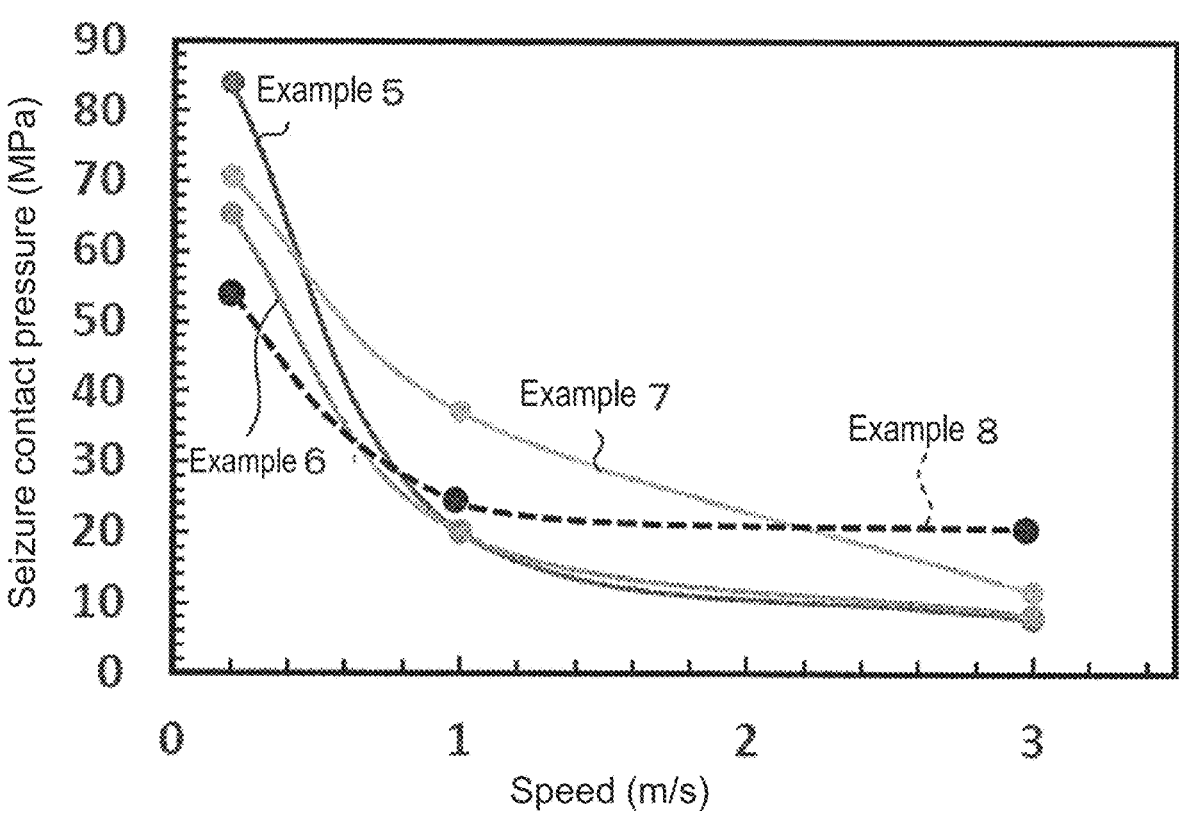
FIG. 13 is a graph showing the limit PV curves of the specimens of Examples 5 to 8.
Figure 14:
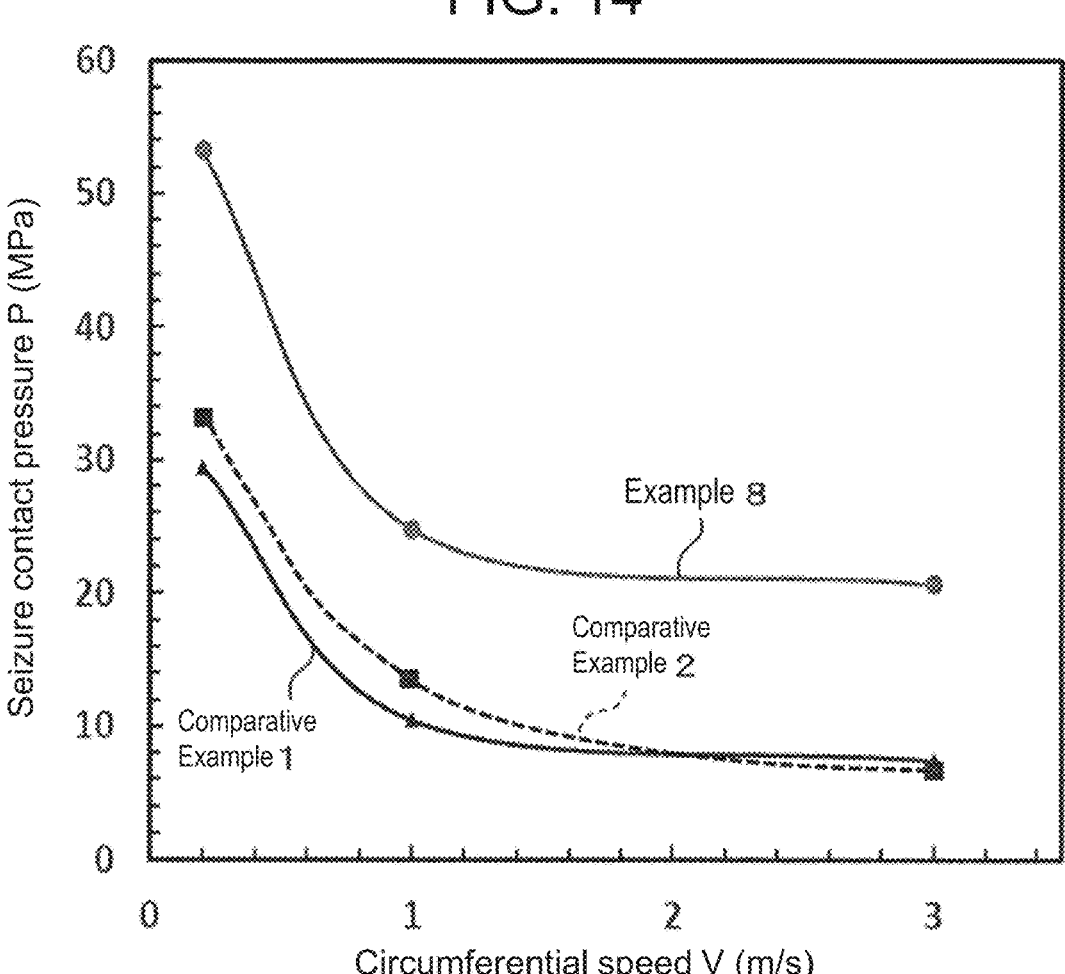
FIG. 14 is a graph showing the limit PV curves of the specimens of the Example 8 and the Comparative Examples 1 and 2.

FIG. 12 shows the limit PV curves of the specimens of Examples 2 to 4, and FIG. 13 shows the limit PV curves of the specimens of Examples 5 to 8. FIG. 14 shows the limit PV curves of the specimen of the Example 8 and Comparative Examples 1 and 2.

It was confirmed in comparison between FIGS. 11 and 12 that all the specimens of Examples 2 to 4, in which MoS$_2$ powder was added to the sliding layers, generally had higher PV values than the specimen of Example 1, in which MoS$_2$ was not added to the sliding layer, and the specimens of Examples 2 to 4 were improved in seizure resistance. When the influence of the MoS$_2$ powder on the seizure contact pressure vs. the circumferential speed was checked with reference to FIG. 12, the seizure contact pressure was around 50 MPa in the low-speed range of 0.2 m/s, around 15 MPa in the medium-speed range of 1 m/s, and around 10 MPa in the high-speed range of 3 m/s. The result was that even an increase in the amount of the MoS$_2$ powder added did not contribute to improvement in seizure resistance.

It was confirmed in comparison between FIGS. 11 and 13 that all the specimen of Examples 5 to 8, in which the hard particles were dispersed in the porous layers, and the hard particle powders were added to the sliding layers, generally had higher PV values than the specimen of Example 1, in which the hard particle powder was not added to the sliding layer, and the specimen of Examples 5 to 8 were improved in seizure resistance as compared with the specimen of Example 1. Although the illustration is omitted, it was confirmed that the specimen of Example 9, in which the hard particles were not dispersed in the porous layers, and the hard particle powder was added to the sliding layer, also exhibited satisfactory seizure resistance in the same way. When the influence of the hard particle powder was checked with reference to FIG. 13, Example 5, containing the hard particle powder at 1% by mass, had a seizure contact pressure of 81.8 MPa, Example 6, containing the hard particle powder at 5% by mass, had a seizure contact pressure of 65.2 MPa, and Example 7, containing the hard particle powder at 10% by mass, had a seizure contact pressure of 70.7 MPa in a low-speed range of 0.2 m/s. While Example 5, containing the hard particle powder at 1% by mass, had a seizure contact pressure of 20.1 MPa, and Example 6, containing the hard particle powder at 5% by mass, had a seizure contact pressure of 19.9 MPa; Example 7, containing the hard particle powder at 10% by mass, had a seizure contact pressure of 37.1 MPa in a medium-speed range of 1 m/s, and it was observed that Example 7 was improved in seizure resistance. Example 5, containing the hard particle powder at 1% by mass, had a seizure contact pressure of 7.8 MPa, Example 6, containing the hard particle powder at 5% by mass, had a seizure contact pressure of 8.3 MPa, and Example 7, containing the hard particle powder at 10% by mass, had a seizure contact pressure of 11.6 MPa in a high-speed range of 3 m/s. The specimen of Example 7, in which the hard particle powder was added to the sliding layer at 10% by mass, and the specimen of Example 8, in which the hard particle powder was added to the sliding layer at 15% by mass, generally had higher PV values than the others (namely the specimens of Examples 1 to 6 and Comparative Examples), and the effect of improving the seizure resistance was observed. It is conceivable that it was because the sliding layers (the resin layers) were hardened depending on the amounts of the hard particle powder added. It was confirmed with reference to FIG. 14 that the specimen of Example 8, to which the hard particle powder was added at 15% by mass, exhibited twice higher seizure contact pressure in the high-speed region of 3 m/s than the specimens of Comparative Examples 1 and 2. It is conjectured from the above that the amount of the hard particle powder added to the sliding layer is preferably 10% by mass or more.

Figure 15:
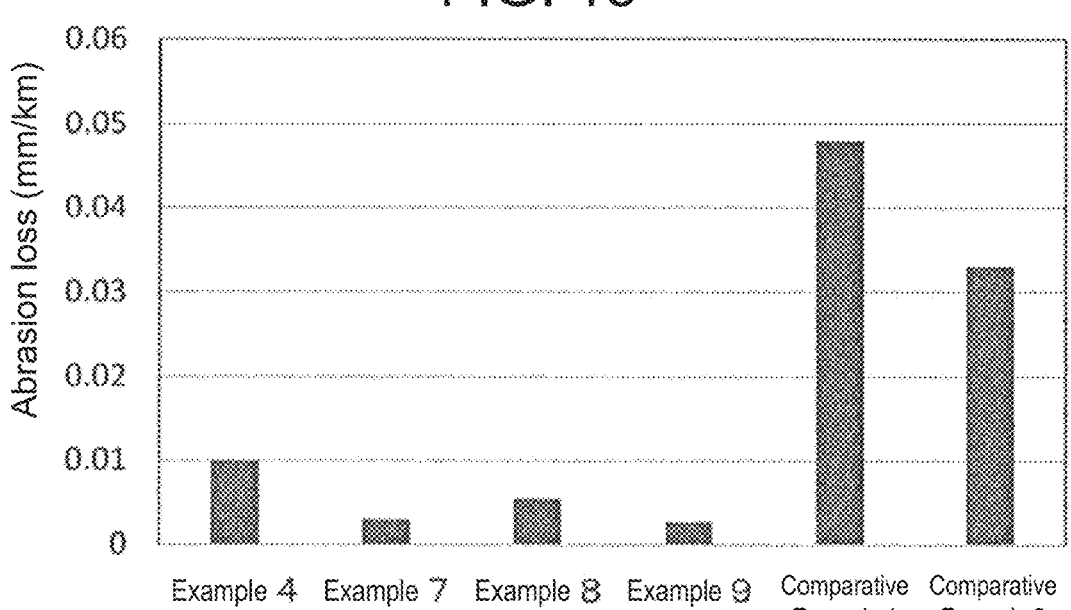
FIG. 15 is a graph showing the abrasion losses at a contact pressure of 10 MPa of the specimens of Examples 4, 7, and 8 and Comparative Examples 1 and 2.

FIG. 15 shows the abrasion losses at a contact pressure of 10 MPa of the specimens of Examples 4, 7, 8, and 9 and Comparative Examples. With reference to FIG. 15, Example 4, in which the hard particles were dispersed in the porous layer, and the $MoS_2$ powder was added to the sliding layer at 10% by mass, exhibited an abrasion loss of 0.01 mm/km, Example 7, in which the hard particles were dispersed in the porous layer, and the hard particle powder was added to the sliding layer at 10% by mass, exhibited an abrasion loss of 0.003 mm/km, Example 8, in which the hard particle powder was added to the sliding layer at 15% by mass, exhibited an abrasion loss of 0.0054 mm/km, Example 9, in which the hard particles were not dispersed in the porous layer, and the hard particle powder was added to the sliding layer at 15% by mass, exhibited an abrasion loss of 0.0027 mm/km, Comparative Example 1 exhibited an abrasion loss of 0.048 mm/km, and Comparative Example 2 exhibited an abrasion loss of 0.033 mm/km in the high-load region of a contact pressure of 10 MPa. It was Example 7, in which the hard particle powder was added to the sliding layer at 10% by mass, and Examples 8 and 9, in which the hard particle powder was added to the sliding layer at 15% by mass, that particularly contributed to reduction in abrasion. It is conjectured that the addition of the hard particle powder (Laves particles) to the resin compound increased the abrasion resistance of the sliding layer (the resin layer), and contributed to reduction in the abrasion from an early stage of the operation.

Although the embodiments and the variations were described above by illustration, the scope of the present technology is not limited to these. The embodiments and the variations can be modified and varied depending on the object within the scope described in claims. As long as the treatment contents do not conflict with each other, the embodiments and the variations can be appropriately combined.

The invention claimed is:

1. A sliding member, comprising:
a metal substrate,
a porous layer formed on one surface of the metal substrate, and
a sliding layer covering the porous layer,
wherein the sliding layer is formed of a resin composition,
wherein the sliding layer formed of the resin composition is impregnated into the porous layer,
wherein the sliding layer is in contact with a surface of the metal substrate, and
wherein the porous layer has
a matrix phase comprising Cu and Sn, and hard particles dispersed in the matrix phase and comprising a Laves phase constituted of a composition of Co, Mo and Si.

2. The sliding member according to claim 1,
wherein the porous layer further has
compound phases dispersed in the matrix phase and comprising Co, Fe, Ni, Si, and Cr.

3. The sliding member according to claim 1,
wherein a content of the hard particles is 40% by mass or less per 100% by mass of a whole of the porous layer.

4. The sliding member according to claim 1,
wherein at least one of a hard particle powder comprising the Laves phase constituted of the composition of Co, Mo and Si, a $MoS_2$ powder, or a bronze powder not comprising a Laves phase is dispersed in the sliding layer.

5. A sliding member, comprising:
a metal substrate,
a porous layer formed on one surface of the metal substrate, and
a sliding layer covering the porous layer,
wherein the sliding layer is formed of a resin composition comprising only PTFE (polytetrafluoroethylene) as a base resin,
wherein the sliding layer formed of the resin composition is impregnated into the porous layer,
wherein the sliding layer is in contact with a surface of the metal substrate, and
wherein a hard particle powder comprising a Laves phase constituted of a composition of Co, Mo and Si is dispersed in the sliding layer and impregnated into the porous layer.

6. The sliding member according to claim 1,
wherein a ratio of a thickness of the porous layer to a thickness of the sliding layer is 6:4 to 8:2.

7. The sliding member according to claim 4,
wherein a sum of a content of the hard particles and a content of the hard particle powder is 1% to 20% by mass per 100% by mass in total of the porous layer and the sliding layer.

8. A bearing, comprising:
the sliding member according to claim 1; and
a cylindrical inner peripheral surface,
wherein the cylindrical inner peripheral surface is constituted of the sliding layer.

9. The sliding member according to claim 1,
wherein a content of the hard particles is 1% to 20% by mass per 100% by mass in total of the porous layer and the sliding layer.

10. The sliding member according to claim 2,
wherein a content of the hard particles is 1% to 20% by mass per 100% by mass in total of the porous layer and the sliding layer.

11. The sliding member according to claim 3,
wherein the content of the hard particles is 1% to 20% by mass per 100% by mass in total of the porous layer and the sliding layer.

12. The sliding member according to claim 5,
wherein a content of the hard particle powder is 1% to 20% by mass per 100% by mass in total of the porous layer and the sliding layer.

* * * * *